United States Patent
Okuyama

(12) 
(10) Patent No.: US 6,273,568 B1
(45) Date of Patent: Aug. 14, 2001

(54) PROJECTION APPARATUS

(75) Inventor: Atsushi Okuyama, Tokorozawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/243,175

(22) Filed: Feb. 2, 1999

(30) Foreign Application Priority Data

Feb. 5, 1998 (JP) .................................................. 10-039638
Jun. 18, 1998 (JP) .................................................. 10-188243

(51) Int. Cl.[7] .............................. G03B 21/00; G03B 21/26
(52) U.S. Cl. .................................. 353/31; 353/30; 353/33
(58) Field of Search ................................ 352/198; 353/30, 353/31, 33, 34, 81, 82, 84; 349/8, 61, 104, 106, 113, 114

(56) References Cited

U.S. PATENT DOCUMENTS

| | | | |
|---|---|---|---|
| 4,864,390 | * 9/1989 | McKechnie et al. | 358/60 |
| 5,179,398 | * 1/1993 | Iizuka | 353/30 |
| 5,295,005 | * 3/1994 | Nishida et al. | 349/8 |
| 5,321,448 | * 6/1994 | Ogawa | 353/34 |
| 5,512,967 | * 4/1996 | Bohannon | 353/31 |
| 5,621,551 | * 4/1997 | Henderson et al. | 349/7 |
| 5,626,409 | * 5/1997 | Nakayama et al. | 353/31 |
| 5,696,564 | * 12/1997 | Hatakeyama | 348/756 |
| 5,812,223 | * 9/1998 | Noguchi | 349/9 |
| 5,897,191 | * 4/1999 | Clarke | 353/31 |

* cited by examiner

Primary Examiner—Russell Adams
Assistant Examiner—Rodney E Fuller
(74) Attorney, Agent, or Firm—Morgan&Finnegan, LLP.

(57) ABSTRACT

A projection apparatus which is provided with a light source, a dichroic mirror for separating a light from the light source in a plurality of color lights, a display panel disposed on the optical path of each of the color lights, a first dichroic mirror for combining two color lights in the display panel illuminated with each of the color lights, a second dichroic mirror for combining and emitting the color lights emitted and combined by the first dichroic mirror and the other color lights, first and second optical units each disposed for the respective color light entering the second dichroic mirror for making the lights telecentric; and a projection lens for projecting the lights emitted and combined by the second dichroic mirror, and which is compact and suffers little from the distortion of optical performance, and particularly of an image.

10 Claims, 15 Drawing Sheets

$\Delta 1 = \Delta 2 = \Delta 3 = \Delta$

SPHERICAL ABERRATION

------ 620.0NM
———— 550.0NM
—·—·— 470.0NM

CURVATURE OF FIELD

DISTORTION

SPHERICAL ABERRATION

------ 620.0NM
———— 550.0NM
—·—·— 470.0NM

CURVATURE OF FIELD

DISTORTION $\Delta'_1 \neq \Delta'_2 \neq \Delta'_3$

PROJECTION APPARATUS

BACKGROUND OF THE INVENTION

1. Field of the Invention

This invention relates to a projection apparatus, and is suitable for a color liquid crystal projector for enlarging and projecting, for example, the original picture of a projected image displayed on a color liquid crystal panel onto the surface of a screen.

2. Related Background Art

There have heretofore been proposed various projection apparatuses (liquid crystal projectors) adapted to enlarge and project the original picture of the projected image of a liquid crystal light valve or the like onto the surface of a screen.

Apparatuses of various types are used as projection apparatuses, and in a projection apparatus using color liquid crystal as the original picture of a projected image, a color combining system such as a reflecting mirror or a dichroic mirror is disposed in the space (back focus) from the last lens surface of a projection lens to a liquid crystal display element to thereby effect the color combination of a colored imaged.

In a color liquid crystal projector using three liquid crystal panels for R, G and B lights as a color liquid crystal projector, use is made of a color combining system for combining color lights transmitted through the three liquid crystal panels into an optical path.

As the color combining system, for example, in Japanese Laid-Open Patent Application No. 1-131593, use is made of a so-called cross dichroic prism comprising four triangular prisms cemented together, and a dichroic surface being designed to cruciformly cross the cemented surface thereof, and this cross dichroic prism is provided in an optical path leading from a liquid crystal panel to a projection lens.

Generally, when a color combining system is comprised of a prism, the thickness of a dichroic surface is very small and its influenced on the optical performance (imaging performance) of a projection lens is very little, and this is suitable for projecting an image of high image quality.

On the other hand, FIG. 7 of the accompanying drawings is a schematic view of the essential portions of a color liquid crystal projector using three dichroic mirrors and a dichroic prism which is proposed in Japanese Laid-Open Patent Application No. 9-211750.

In FIG. 7, of the lights emitted from a light source 201 using a metal halide lamp, red light (light of about 600 nm to about 700 nm) is reflected by a red reflecting dichroic mirror 202 and the other lights are transmitted therethrough. The reflected red light has its travelling path changed by a reflecting mirror 203 and enters a liquid crystal light valve 206 for red. Of the lights transmitted through the red reflecting dichroic mirror 202, green light (light of about 500 nm to about 600 nm) is reflected by a blue transmitting dichroic mirror 204, and blue light (light of about 400 nm to about 500 nm) is transmitted therethrough. The green light reflected by the dichroic mirror 204 enters a liquid crystal light valve 205 for green, and the blue light transmitted through the dichroic mirror 204 enters a liquid crystal light valve 207 for blue. Each liquid crystal light valve has a polarizer 221 and an analyzer 222 mounted thereon, whereby light is modulated for each color to thereby form an image.

The blue light light-modulated by the liquid crystal light valve 207 for blue is reflected by a reflecting mirror 208, and is made incident on a blue transmitting dichroic prism 227 to be transmitted therethrough, and is enlarged and projected by a projection lens 211. The green light light-modulated by the liquid crystal light valve 205 for green is made incident on a red transmitting dichroic mirror 209 to be reflected therefrom, and is made incident on the blue transmitting dichroic prism 227 to be reflected therefrom, and is enlarged and projected by a projection lens 211. The red light light-modulated by the liquid crystal light valve 206 for red is made incident on the red transmitting dichroic mirror 209 to be transmitted therethrough, and is made incident on the blue transmitting dichroic prism 227 to be reflected therefrom, and is enlarged and projected by the projection lens 211. The combination of the red light and the green light is effected by the dichroic mirror 209, and the combination of the aforementioned combined light and the blue light is effected by the dichroic prism 227.

Liquid crystal projections in which a projection lens is comprised of a telecentric system are proposed, for example, in Japanese Laid-Open Patent Application No. 8-122699, Japanese Laid-Open Patent Application No. 10-10467, etc. Japanese Laid-Open Patent Application No. 8-122699 proposes an image projecting apparatus comprising a light source, a spatial light modulating element, an illuminating optical system for applying the light from the light source to the spatial light modulating element, and a projection optical system for projecting the image of the spatial light modulating element, and which is comprised of an illuminating optical system or a projection optical system. Japanese Laid-Open Patent Application No. 10-10467 proposes a projection display apparatus comprised of a light source device, an optical integrator for converting the light from the light source into a uniform light beam, a reflection type liquid crystal panel for modulating the light beam from the optical integrator and displaying an image, and a projection lens for enlarging and projecting the image displayed on the reflection type liquid crystal panel onto a screen.

A cross dichroic prism for color combination or color resolution suffers from the disadvantage that the deviation of liquid crystal pixels forming an image on a screen is caused by the inclination or level difference of two cemented surfaces when two prism surfaces are cemented together to form a dichroic surface performing a function (e.g. reflecting red light) into the two prism surfaces.

This disadvantage appears more remarkably as the number of the pixels of the liquid crystal used becomes greater and therefore, to solve this problem, the cementing step of very high accuracy becomes necessary, and it is feared that the costs of parts are increased.

On the other hand, in the liquid crystal projector shown in FIG. 7, a dichroic surface near the projection lens 211 is comprised of a prism and is made into a dichroic prism 227, and dichroic surface and reflecting surfaces near the liquid crystal panels 205, 206 and 207 are comprised of a dichroic mirror 209 and a mirror 208, respectively. When such a construction is adopted, the problem in the manufacture of the dichroic surfaces in the dichroic prism is avoided and the weight is not increased. However, in the optical path transmitted through the dichroic mirror 209, the dichroic mirror 209 is disposed obliquely relative to the optical path and therefore, there is the problem that astigmatism by the thickness of the dichroic mirror and the distortion of an asymmetrical image occur and in the optical path reflected by the dichroic mirror 209, the distortion of an asymmetrical image due to the distortion of the reflecting surface occurs.

It is written that in the color liquid crystal projector shown in FIG. 7, the deterioration of performance occurs to the reflecting optical path and transmitting optical path of the dichroic mirror 209, but the specific substance of the deterioration is not mentioned. The setting of the optical paths when a dichroic mirror is used need be considered with a phenomenon occurring in this dichroic mirror taken into account, and this will now be described with reference to FIGS. 8 and 9 of the accompanying drawings. The distortion of an image occurring in the transmitting optical path is such that when as shown in FIG. 8, the principal ray of light is incident on the dichroic mirror 209 at different angles, the amounts of shift ($\Delta'1$, $\Delta'2$ and $\Delta'3$) of the ray of light by the thickness of the mirror differ from one another and non-uniform distortion occurs to a projected image. On the other hand, in the reflecting optical path, as shown in FIG. 9, due to the distortion of the surface, the direction of reflection of the incident principal ray of light deviates from a predetermined direction and non-uniform distortions ($\delta1$ and $\delta2$) occur to the projected image. These distortions of the image occur asymmetrically though due to different causes and therefore, even if the liquid crystal panels are moved, the deviation of the pixels of the liquid crystal panels 206 and 205 cannot be corrected.

Now, there has been the problem that if in a construction wherein dichroic film is sandwiched between two members of glass, an attempt is made to increase the number of layers of the film and improve the optical performance of the dichroic film, and fluctuation of the half value cut wavelength of the dichroic film by the angle of incidence on the dichroic surface becomes great and color irregularity occurs in the picture plane of a projected image.

Against such a problem, the applicant of the basic application filed in Japan has proposed in Japanese Laid-Open Patent Application No. 7-294924 a construction of dichroic characteristic for suppressing color irregularity effectively in a liquid crystal projector using a dichroic mirror.

In the above-mentioned publication, description is not made of a liquid crystal projection having dichroic film sandwiched between two members of glass.

SUMMARY OF THE INVENTION

It is an object of the present invention to provide a projection apparatus which uses a color combining system in which image information based on a color liquid crystal panel is appropriately set and a projection optical system and can thereby project the image information onto a predetermined surface (a screen surface) while having high optical performance.

It is also an object of the present invention to provide a projection apparatus which uses a color resolving optical system in which image information based on a color liquid crystal panel is appropriately set and a color combining system and can thereby project the image information onto a predetermined surface (a screen surface) without any color irregularity while having high optical performance.

A projection apparatus according to the present invention is provided with:

a light source;

a dichroic mirror for separating a light from the light source into a plurality of color lights;

a display panel disposed on an optical path of each of the color lights;

a first dichroic mirror for combining two color lights in the display panel illuminated with each of the color lights;

a second dichroic mirror for combining the color lights combined by and emerged from the first dichroic mirror and the other color light and for causing the combined color lights to be emerged therefrom;

first and second optical units each disposed for the respective color lights incident on the second dichroic mirror for making the lights telecentric; and a projection lens for projecting the lights combined by and emerged from the second dichroic mirror.

Or a projection apparatus according to the present invention is provided with:

a light source;

a dichroic mirror for separating a light from the light source into a plurality of color lights;

a display panel disposed on an optical path of each of the color lights;

a first dichroic mirror for combining two color lights in said display panel illuminated with each of the color lights;

a second dichroic mirror for combining the color lights combined by and emerged from the first dichroic mirror and the other color light and for causing the combined color lights to be emerged therefrom;

first and second optical units each disposed for the respective color lights incident on the second dichroic mirror for making the lights telecentric; and a projection lens unit for projecting the lights combined by and emerged from the second dichroic mirror;

wherein when the cut wavelengths of two dichroic mirrors disposed on one of three optical paths leading from the light source to the second dichroic mirror and the second dichroic mirror at a predetermined angle of incidence are defined as $\lambda1$, $\lambda2$ and $\lambda0$, respectively, the following conditions are satisfied:

$\lambda1 < \lambda0 < \lambda2$ $0 < \lambda0 - \lambda1 < 20$ nm $0 < \lambda2 - \lambda0 < 20$ nm.

DESCRIPTION OF THE PREFERRED EMBODIMENTS

Figure 1:
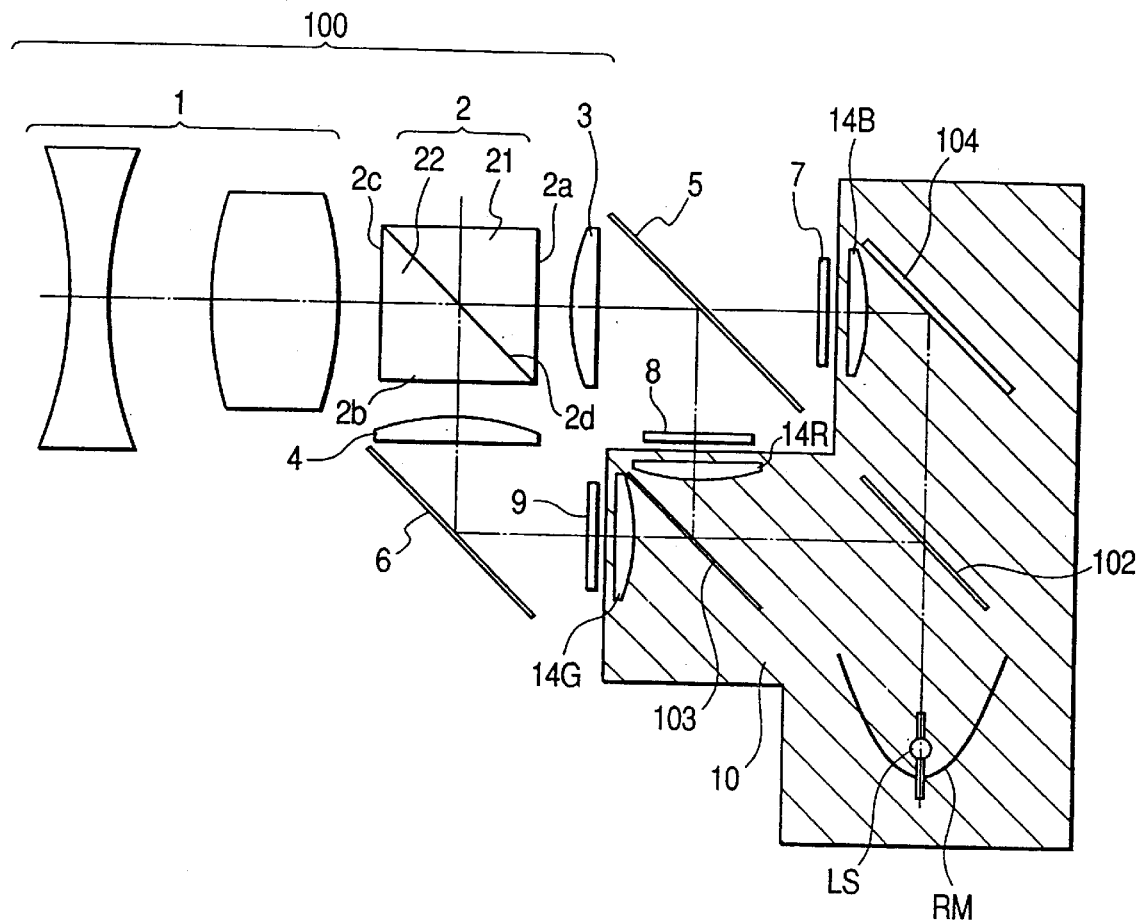
FIG. 1 is a schematic view of the essential portions of Embodiment 1 when the projection apparatus of the present invention is applied to a color liquid crystal projector of a three-plate type.

FIG. 1 is a schematic view of the essential portions of Embodiment 1 of the present invention, and shows a case where the present invention is applied to a color liquid crystal projector of a three-plate type.

In FIG. 1, reference numeral 10 designates an illuminating system, and reference numeral 100 denotes a projection lens system. The illuminating system 10 separates a light from a white light source LS into blue, green and red lights by the use of dichroic mirrors 102 and 103 and illuminates liquid crystal panels 7, 8 and 9 which will be described later. The projection lens system 100 has a projection lens 1 and first and second field lenses 3 and 4, and projects an image based on the liquid crystal panels 7, 8 and 9 onto a screen surface.

The construction of the illuminating system 10 will first be described. The light beam from the light source LS such as a metal halide lamp is reflected and condensed by a condensing mirror RM and is caused to impinge on a dichroic mirror 102.

Of the light beam from the light source LS, blue light (B light) is transmitted through the dichroic mirror 102 and green light (G light) and red light (R light) are reflected by the dichroic mirror 102.

Of the G light and R light from the dichroic mirror 102, the R light is reflected by a dichroic mirror 103 and the G light is transmitted through the dichroic mirror 103. The B light transmitted through the dichroic mirror 102 illuminates the liquid crystal panel for B light (first liquid crystal panel) 7 through the intermediary of a mirror 104 and a condenser lens 14B. The R light reflected by the dichroic mirrors 102 and 103 illuminates the liquid crystal panel for R light (second liquid crystal panel) 8 through a condenser lens 14R.

The G light reflected by the dichroic mirror 102 and transmitted through the dichroic mirror 103 illuminates the liquid crystal panel for G light (third liquid crystal panel) 9 through a condenser lens 14G.

The projection optical system 100 will now be described.

The light beam from the liquid crystal panel 7 for B light is transmitted through a dichroic mirror 5 for transmitting the B light therethrough and reflecting the R light and enters a first entrance surface 2a of a dichroic prism 2 comprising two prisms 21 and 22 each having dichroic film applied to a color-combining joined surface and cemented together through the first field lens 3.

The light beam from the liquid crystal panel 8 for R light is reflected by the dichroic mirror 5 and enters the first entrance surface 2a of the dichroic prism 2 through the first field lens 3.

The light beam from the liquid crystal panel 9 for G light is reflected by a mirror 6 and enters a second entrance surface 2b of the dichroic prism 2 through the second field lens 4.

Images based on the liquid crystal panels 7, 8 and 9 are combined together by the dichroic surface 2d of the dichroic prism 2, and the combined image is caused to emerge from an exit surface 2c and is projected onto the surface of a screen (not shown) by the projection lens 1.

The first and second field lenses 3 and 4 act to make the image plane side (the liquid crystal panel side) of the projection lens 1 telecentric.

While in the present embodiment, the liquid crystal panels 7, 8 and 9 are for B light, R light and G light, respectively, these can be arbitrarily set for any color lights.

The dichroic surface 2d of the dichroic prism 2 may be adapted to reflect the blue light and the red light and transmit the green light therethrough, and the projection lens 1 may be disposed in the direction of transmission of the green light with the direction thereof changed by 90°.

In the present embodiment, the projection lens 1 having the main refractive power, the dichroic prism 2 comprising two prisms cemented together and having the cemented surface thereof made into a dichroic surface, the dichroic mirror 5 having a dichroic surface provided on one surface thereof and anti-reflection film provided on the other surface thereof, the mirror 6 having one surface thereof made into a reflecting surface, the first field lens 3 provided between the dichroic prism 2 and the dichroic mirror 5 and constituting the projection optical system 100, and the second field lens 4 provided between the dichroic prism 2 and the mirror 6 and constituting the projection optical system 100 are provided in optical paths leading from the liquid crystal panels 7, 8 and 9 to the screen, and the present embodiment is comprised of a first optical path in which the light from the first liquid crystal panel 7 is transmitted through the dichroic mirror 5, is transmitted through the first field lens 3, is transmitted through (reflected by) the dichroic surface 2d of the dichroic prism 2, and is transmitted through the projection lens 1 to the screen, a second optical path in which the light from the second liquid crystal panel 8 is reflected by the dichroic mirror 5, is transmitted through the first field lens 3, is transmitted through (reflected by) the dichroic surface 2a of the dichroic prism 2, and is transmitted through the projection lens 1 to the screen, and a third optical path in which the light from the third liquid crystal panel 9 is reflected by the mirror 6, is transmitted through the second field lens 4, is reflected by (transmitted through) the dichroic surface 2a of the dichroic prism 2, and is transmitted through the projection lens 1 to the screen, and further in the projection optical system 100, the optical paths leading from the first field lens 3 and the second field lens 4 to the liquid crystal panels 7, 8 and 9 are made substantially telecentric to thereby improve the aforedescribed deterioration of the image attributable to the dichroic mirror and yet realize projection and color combination of light weight and high performance by the use of a dichroic prism and a dichroic mirror of low cost.

Figure 2:
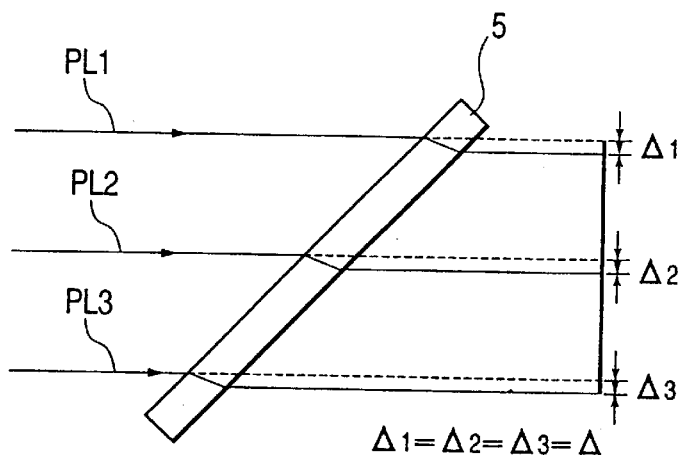
FIG. 2 is an illustration of a portion of FIG. 1.

The dichroic mirror 5 has its thickness set to such surface accuracy that the distortion of the image in the reflecting optical path does not occur and so that in the transmitting optical path, the principal rays incident angle on the dichroic mirror 5 may become substantially equal (telecentric). Thereby, as shown in FIG. 2, the amounts of shift ($\Delta 1$, $\Delta 2$, $\Delta 3$) of the principal rays (PL1–PL3) on the dichroic mirror 5 become a substantially uniform amount $\Delta$, and the liquid crystal panel 7 is moved by the amount $\Delta$ in the direction of shift to thereby correct the deviation of pixels well. Also, the angle of the principal ray transmitted through the liquid crystal panel in which the principal ray incident on the liquid crystal panel is set telecentrically is rendered into 0° to thereby prevent the occurrence of the irregularity of the contrast in the image. As a method of making the interior of the liquid crystal panels telecentric, there is also a method of setting field lenses near the respective liquid crystal panels, but such a method cannot solve the asymmetrical image distortion in the transmitting optical path of the dichroic mirror as previously described.

The shapes of the first field lens 3 and the second field lens 4 may be the same, but these field lenses may differ in shape and lens construction from each other so as to effectively correct the chromatic aberrations of magnification in their respective optical paths.

Also, the first optical path transmitted through the dichroic mirror 5 is set to the optical path of the blue image of low spectral luminous efficacy, whereby the astigmatism occurring when it is transmitted through the dichroic mirror 5 can be reduced and therefore, it is desirable that the first optical path be blue light, and since in the first optical path, astigmatism is created by the dichroic mirror 5, the length of the optical path from the liquid crystal panel 7 in the first optical path to the projection lens 1 is made greater than the lengths of the optical paths from the second and third liquid crystal panels 8 and 9 to the projection lens 1, and it is installed at the position of the average image plane of astigmatism.

The dichroic surface near the projection lens 1 is formed by a prism, whereby the surface accuracy of the dichroic surface can be kept high, and the deterioration of the optical performance (imaging performance) of the projection lens is prevented. Also, the dichroic surface is formed by a single surface, whereby the construction of the dichroic prism becomes simple and the manufacturing cost is prevented from rising.

Further, the projection optical system 100 is comprised of a first lens unit having negative refractive power at the screen side, at least one lens unit having positive refractive power, and lens units (3, 5) having positive refractive power so that the lengths of the optical paths from the projection lens 1 to the liquid crystal panels 7, 8 and 9 can be made great.

Figure 3:
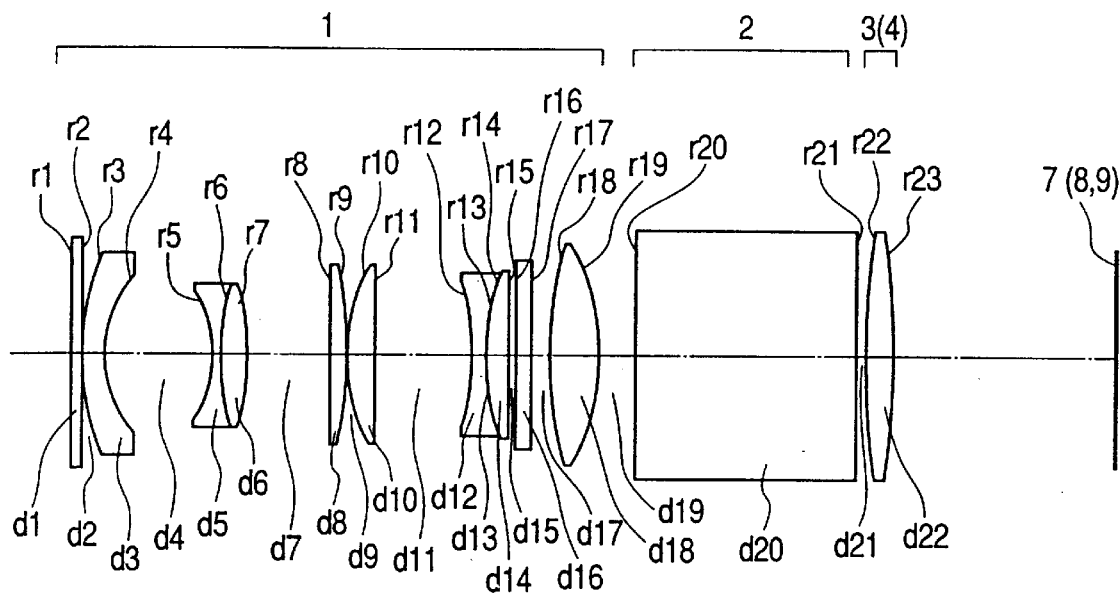
FIG. 3 is a lens cross-sectional view of Numerical Value Embodiment 1 of a projection optical system according to the present invention.
Figure 4:
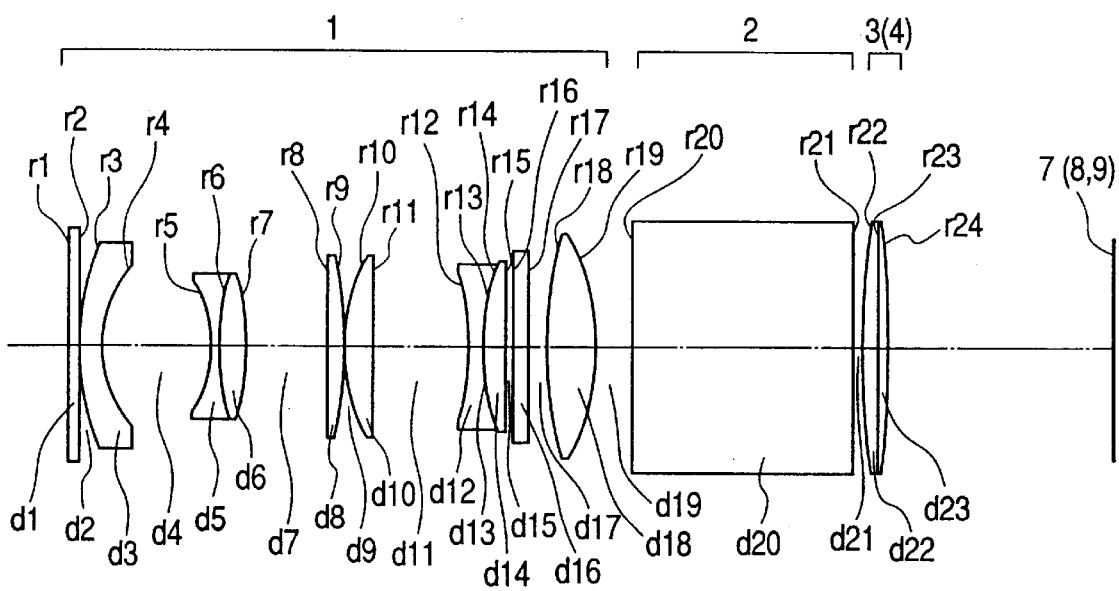
FIG. 4 is a lens cross-sectional view of Numerical Value Embodiment 3 of the projection optical system according to the present invention.
Figure 5A:
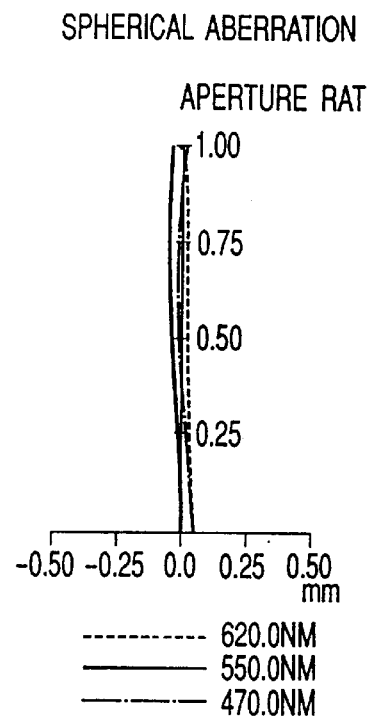
FIGS. 5A, 5B and 5C show the aberrations at the wide angle end of Numerical Value Embodiment 1 of the projection optical system according to the present invention.
Figure 5B:
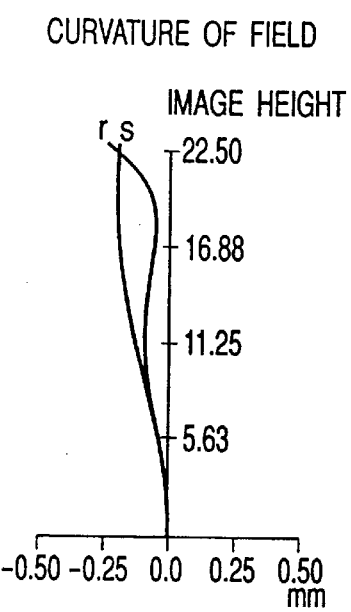
Figure 5C:
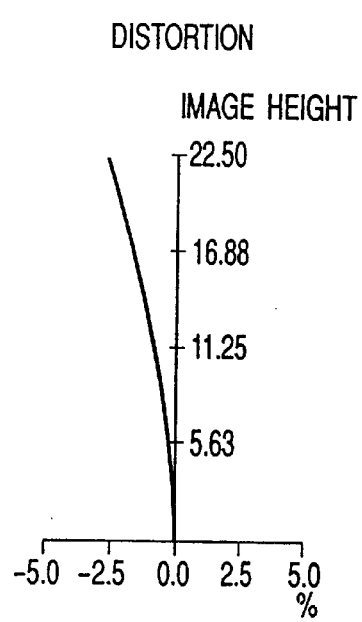
Figure 6A:
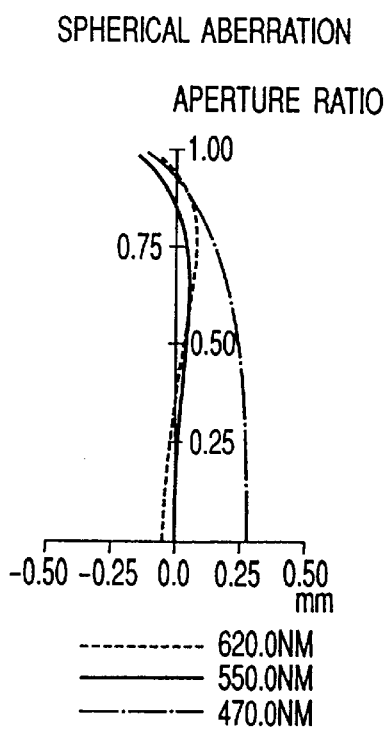
FIGS. 6A, 6B and 6C show the aberrations at the telephoto end of Numerical Value Embodiment 1 of the projection optical system according to the present invention.
Figure 6B:
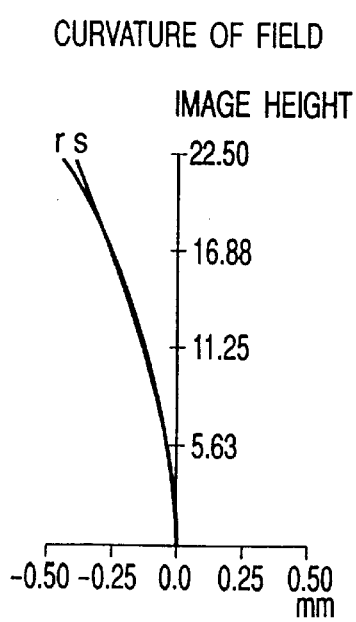
Figure 6C:
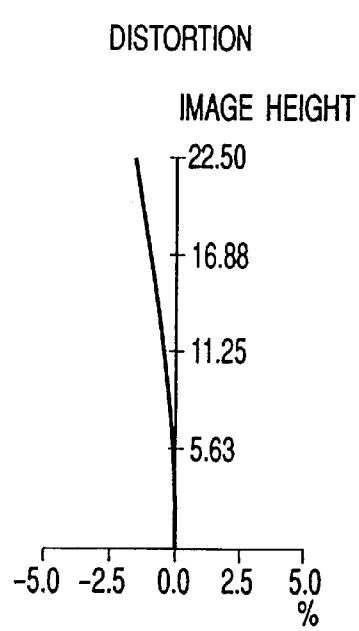
Figure 7:
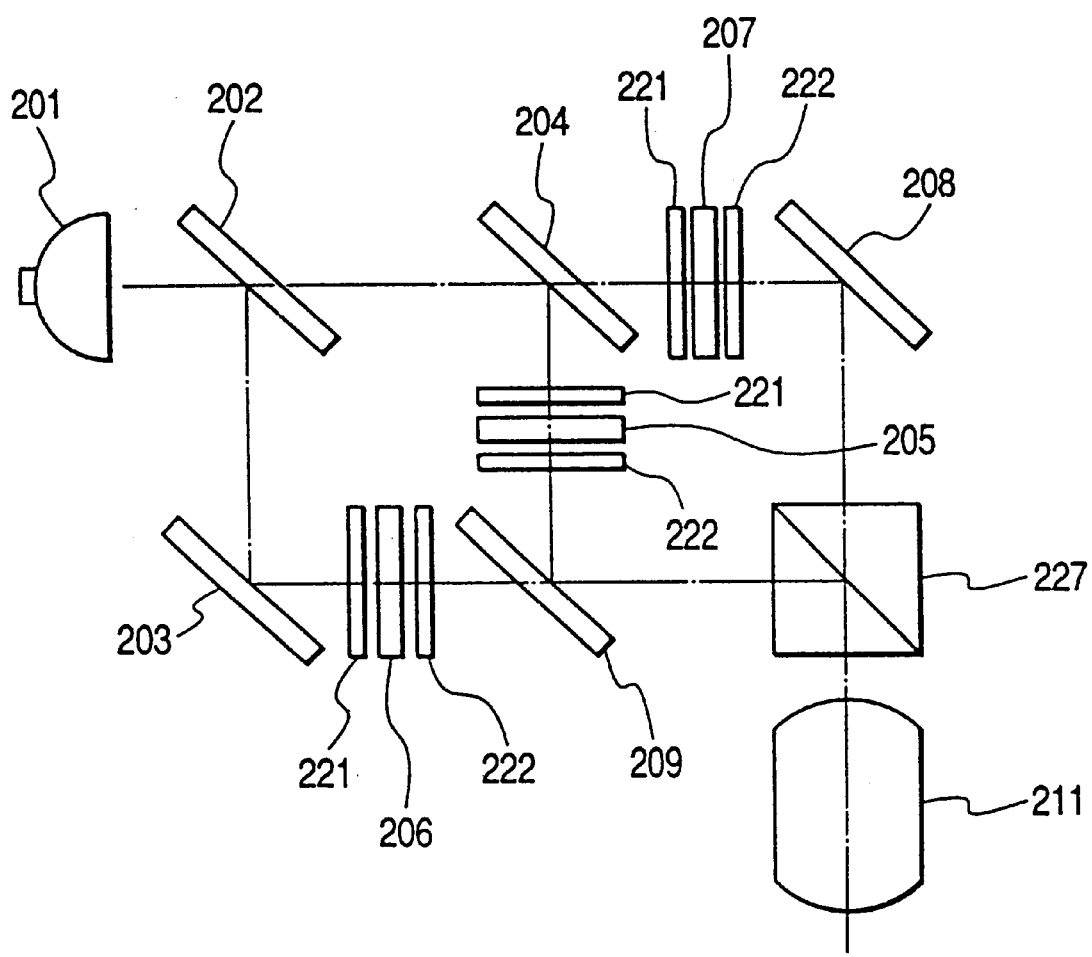
FIG. 7 is a schematic view of the essential portions of a color liquid crystal projector according to the prior art.
Figure 8:
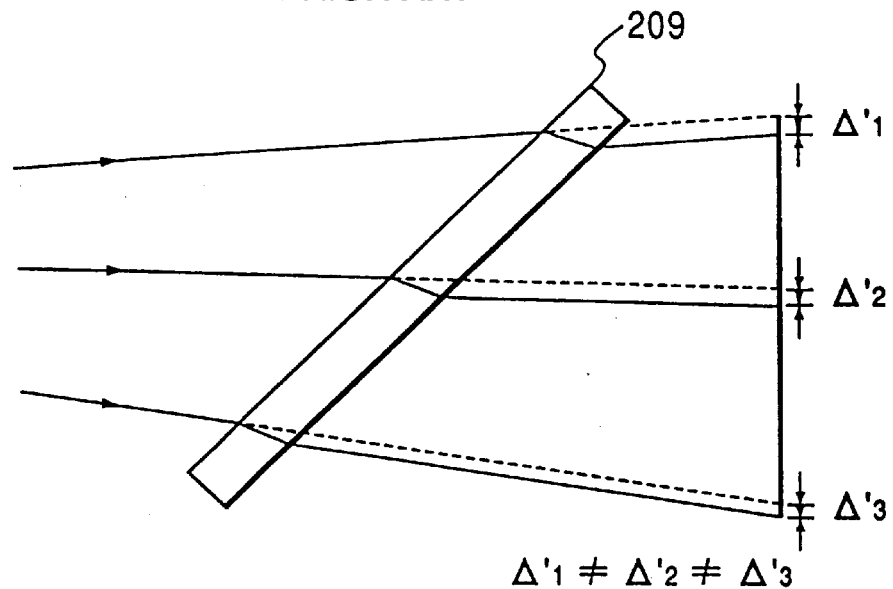
FIG. 8 is an illustration of a portion of FIG. 7.
Figure 9:
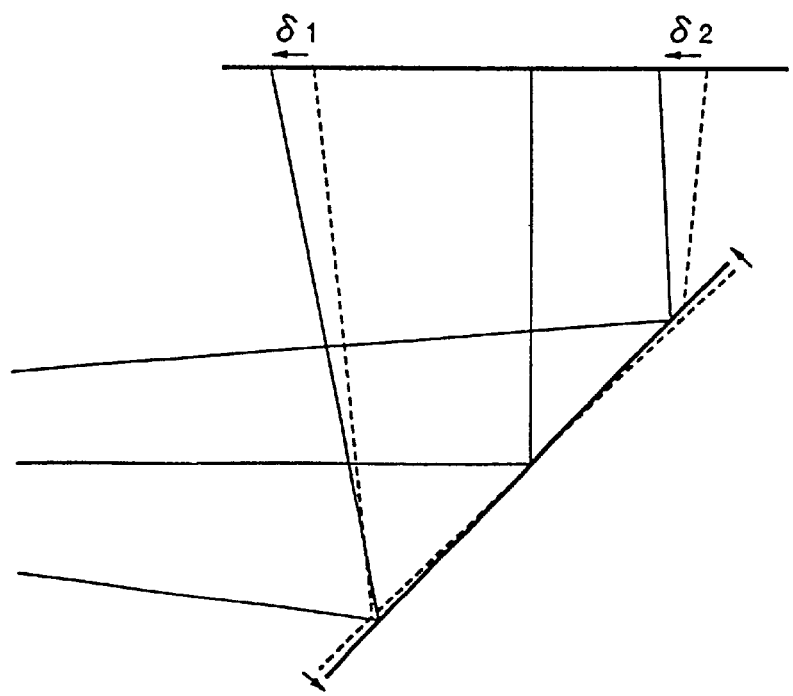
FIG. 9 is an illustration of a portion of FIG. 7.

FIGS. 3 and 4 are the lens cross-sectional views of Numerical Value Embodiments 1 and 3, respectively, of the projection optical system 100 according to the present invention shown in FIG. 1.

In FIGS. 3 and 4, reference numeral 1 designates a projection lens, and reference numeral 3 (4) denotes a first (second) field lens. In FIGS. 3 and 4, a dichroic prism 2 is not always necessary as the projection optical system, but is shown because it is used as a projection device. Also, the dichroic prism 2 is handled as an optical block in aberration correction.

The projection lens 1 is common to Numerical Value Embodiments 1 and 3 of FIGS. 3 and 4, and these embodiments differ only in the lens construction of the field lens 3 (4) from each other. In FIG. 3, the field lens 3 (4) is comprised of a single lens, and in FIG. 4, the field lens 3 (4) is comprised of a cemented lens comprising two lenses joined together.

A Numerical Value Embodiment of the projection lens is shown in Table 1 below. In the numerical value embodiment, Ri represents the radius of curvature of the ith lens surface from the screen side, Di represents the thickness and air space of the ith lens surface from the screen side, and Ni and $\nu$i represent the refractive index and Abbe number, respectively, of the medium of the ith lens surface from the screen side. The aspherical surface shape is represented by the following expression when the direction of the optical axis is the X-axis, a direction perpendicular to the optical axis is the H-axis, the direction from the screen to the liquid crystal panels is positive, R is the paraxial radius of curvature, and K, A, B, C and D are aspherical surface coefficients:

$$X = \frac{\left(\frac{H^2}{R}\right)}{1 + \sqrt{1 - (1+k)\left(\frac{H^2}{R}\right)}} + AH^4 + BH^6 + CH^8 + DH^{10}$$

The aspherical surface coefficients are shown in Table 2 below.

(Numerical Value Embodiment 1)

TABLE 1

| Surface No. | r | d | Nd | $\nu$d |
| --- | --- | --- | --- | --- |
| 1 | ∞ | 2.50 | 1.51633 | 64.2 |
| 2 | ∞ | 0.50 | | |
| 3 | aspherical surface | 4.20 | 1.49171 | 57.2 |
| 4 | 27.681 | 21.82 | | |
| 5 | −23.479 | 2.00 | 1.58144 | 40.7 |
| 6 | 93.974 | 4.31 | 1.80518 | 25.4 |
| 7 | −62.845 | D1 | | |
| 8 | 765.392 | 3.02 | 1.60311 | 60.7 |
| 9 | −147.717 | 0.20 | | |
| 10 | 43.697 | 5.92 | 1.63854 | 55.4 |
| 11 | −669.850 | 18.96 | | |
| 12 | −53.811 | 2.50 | 1.74077 | 27.8 |
| 13 | 44.466 | 0.49 | | |
| 14 | 53.002 | 4.20 | 1.51633 | 64.2 |
| 15 | 3748.805 | 1.50 | | |
| 16 | 321.561 | 2.95 | 1.49171 | 57.2 |
| 17 | aspherical surface | 3.68 | | |
| 18 | 96.324 | 10.06 | 1.51633 | 64.2 |

TABLE 1-continued

| 19 | −44.771 | D2 | | |
|---|---|---|---|---|
| 20 | ∞ | 45.00 | 1.51633 | 64.2 |
| 21 | ∞ | 2.00 | | |
| 22 | 155.620 | 5.22 | 1.51633 | 64.2 |
| 23 | −209.352 | | | |

Fluctuation of the Spacing

| | wide angle end | Telephoto end |
|---|---|---|
| D1 | 17.37 | 1.70 |
| D2 | 7.69 | 53.70 |

TABLE 2

Aspherical surface Coefficients

| surface No. | r | K | A | B | C | D |
|---|---|---|---|---|---|---|
| 3 | 80.315 | 8.325 | 3.319E−06 | −1.278E−09 | 4.328E−12 | 0.000E+00 |
| 17 | −1057.743 | 0.000 | 5.100E−06 | 6.378E−10 | −1.658E−12 | −2.435E−15 |

Also, the chromatic aberrations of magnification in blue ($\lambda$=470 nm) and red ($\lambda$=620 nm) with respect to green ($\lambda$=550 nm) at this time are shown in Table 3 below.

TABLE 3

Chromatic Aberrations of Magnification

| image height | R-G | B-G |
|---|---|---|
| 5.625 | 0.004 | 0.001 |
| 11.250 | 0.008 | 0.003 |
| 16.875 | 0.011 | 0.007 |
| 22.500 | 0.014 | 0.013 |

(Numerical Value Embodiment 2)

While in Numerical Value Embodiment 1, the first field lens and the second field lens are common to each other, the numerical value embodiment shown below is an embodiment in which the projection lens is the same as that in the projection lens is the same as that in the first numerical value embodiment and the second field lens differs in shape from the first field lens. In this embodiment, blue light is set in the first optical path, green light is set in the second optical path, and red light is set in the third optical path, and the chromatic aberration of magnification in red is corrected by the second field lens. The lens data of only the field lenses for the third optical path are shown in Table 4 below. The chromatic aberrations of magnification at this time are shown in Table 5 below.

TABLE 4

| surface No. | r | d | Nd | vd |
|---|---|---|---|---|
| 22 | 154.998 | 5.22 | 1.51633 | 64.2 |
| 23 | −209.352 | | | |

TABLE 5

Chromatic Aberrations of Magnification

| image height | R-G | B-G |
|---|---|---|
| 5.625 | 0.001 | 0.001 |
| 11.250 | 0.001 | 0.003 |
| 16.875 | 0 | 0.007 |
| 22.500 | −0.001 | 0.013 |

(Numerical Value Embodiment 3)

Numerical Value Embodiment 3 is an embodiment in which the projection lens is the same as that in Numerical value Embodiment 1 and the first field lens is a cemented lens, and in this embodiment, the chromatic aberration of magnification in blue is corrected. The data of only the field lenses for the first and second optical paths are shown in Table 6 below. The chromatic aberrations of magnification of the second field lens combined which is shown in Numerical Value Embodiment 2 are shown in Table 7 below.

TABLE 6

| surface No. | r | d | Nd | vd |
|---|---|---|---|---|
| 22 | 160.214 | 3.34 | 1.51633 | 64.2 |
| 23 | −1843.990 | 1.82 | 1.83481 | 42.7 |
| 24 | −306.199 | | | |

TABLE 7

| image height | R-G | B-G |
|---|---|---|
| 5.625 | 0.001 | −0.002 |
| 11.250 | 0.001 | −0.002 |
| 16.875 | 0 | −0.001 |
| 22.500 | −0.001 | 0.002 |

According to the present invention, as described above, there can be achieved a projection apparatus which uses a color combining system in which image information based on color liquid crystal panels is appropriately set and a projection optical system, whereby which can project the image information onto a predetermined surface (a screen surface) while having high optical performance.

Figure 10:
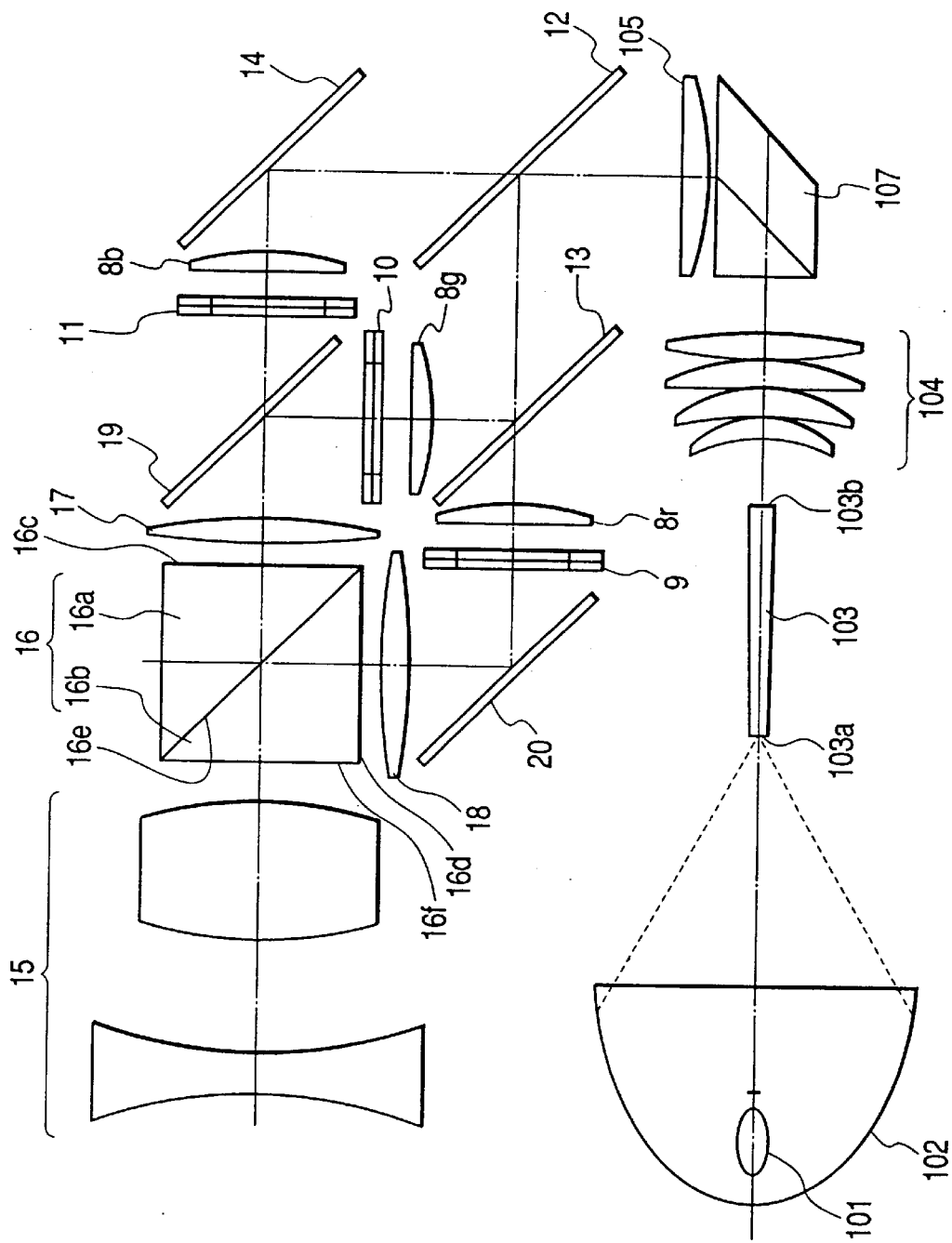
FIG. 10 is a schematic view of the essential portions of an embodiment when the projection apparatus of the present invention is applied to a color liquid crystal projector of the three-plate type.
Figure 11:
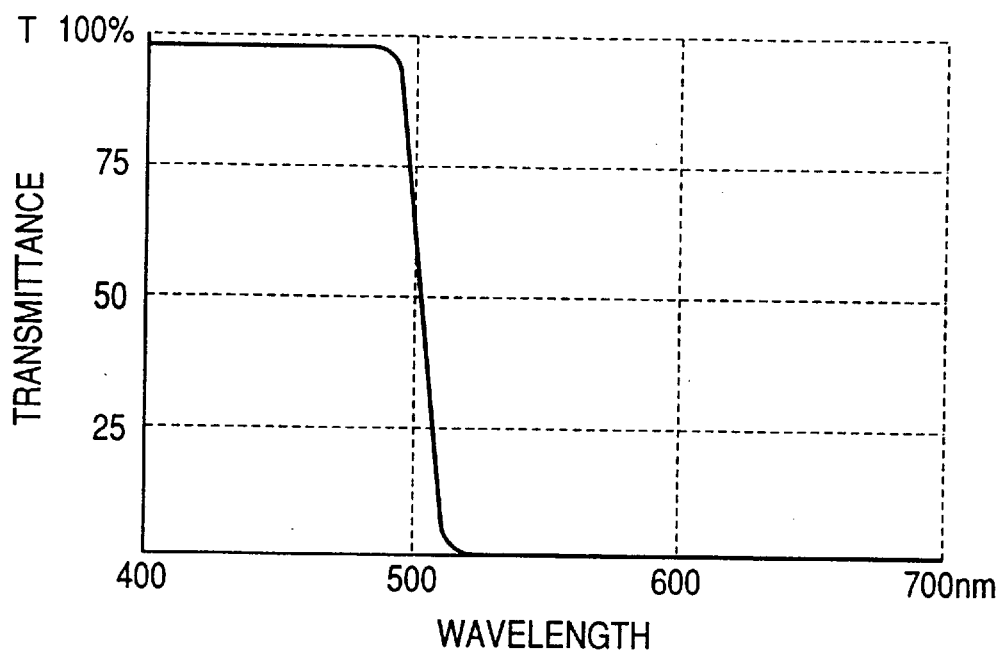
FIG. 11 is an illustration of the spectral characteristic of the dichroic mirror of FIG. 10.
Figure 12:
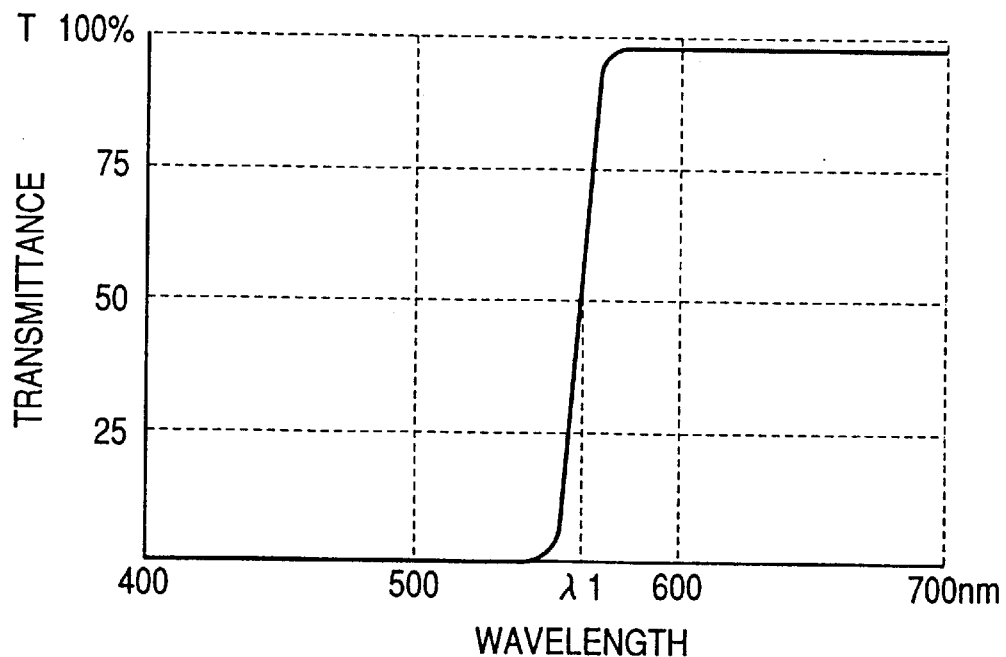
FIG. 12 is an illustration of the spectral characteristic of the dichroic mirror of FIG. 10.
Figure 13:
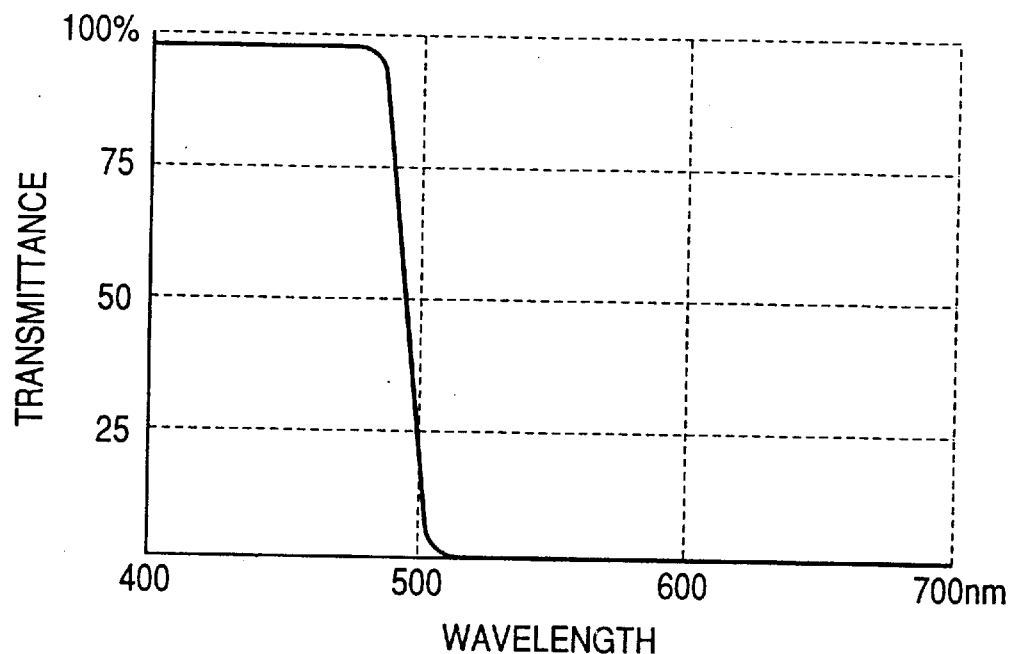
FIG. 13 is an illustration of the spectral characteristic of the dichroic mirror of FIG. 10.
Figure 14:
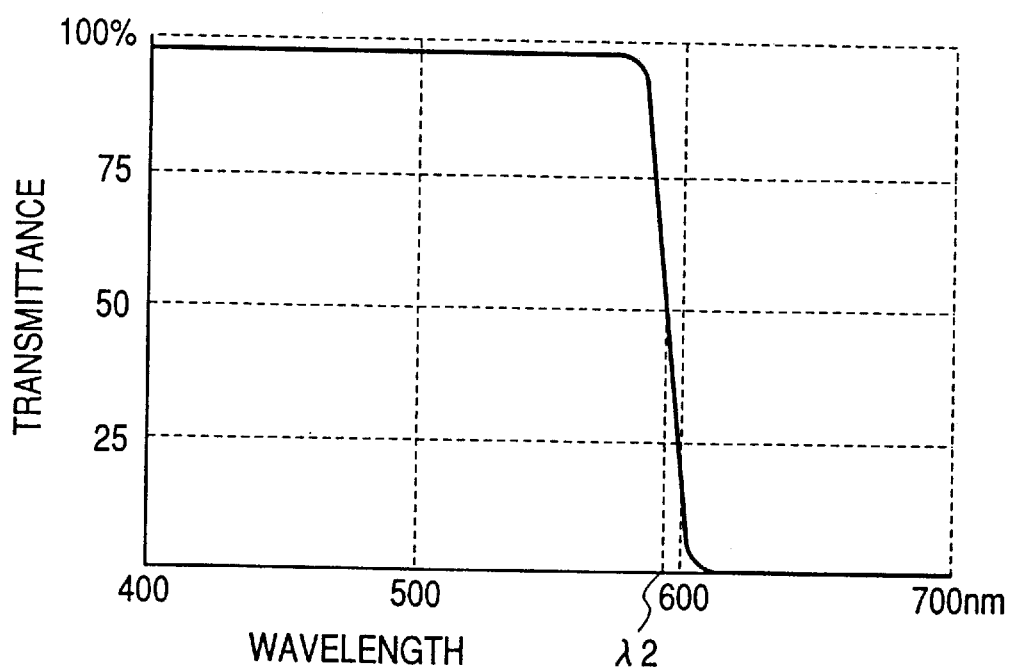
FIG. 14 is an illustration of the spectral characteristic of the dichroic mirror of FIG. 10.
Figure 15:
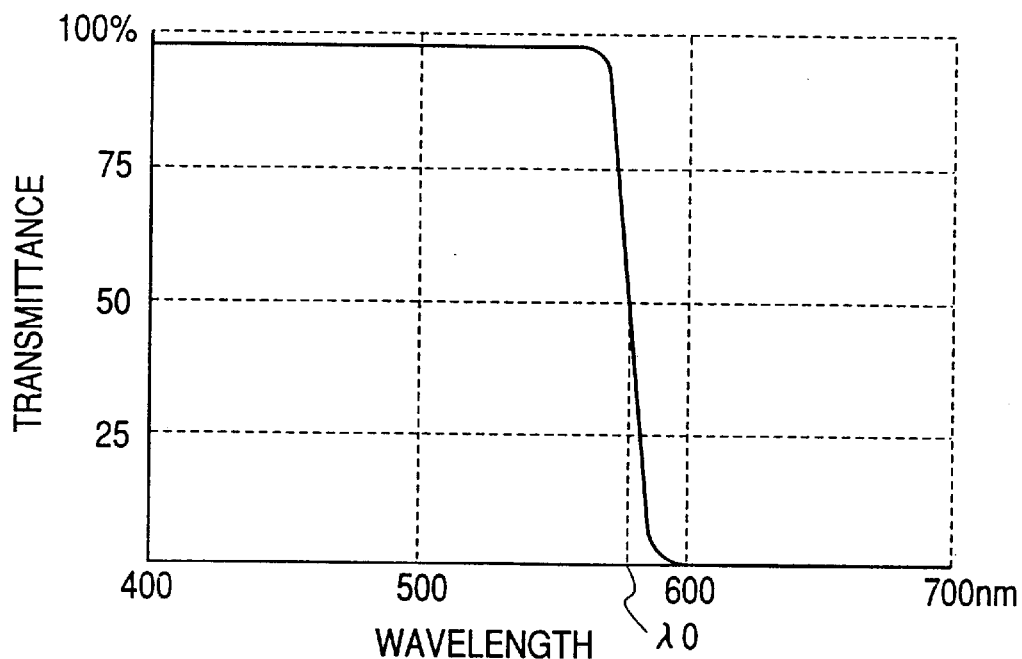
FIG. 15 is an illustration of the spectral characteristic of the dichroic film of FIG. 10.

FIG. 10 is a schematic view of the essential portions of the optical system of a projection apparatus according to an embodiment of the present invention. This figure shows a case where the present invention is applied to a color liquid crystal projector of the three-plate type. In FIG. 10, the reference numeral 101 designates a while light source as a light source, which comprises, for example, a metal halide lamp or the like.

Reference numeral 102 denotes a reflector which comprises an elliptical mirror and effectively condenses a light beam emitted from the white light source 101 disposed at a first focus thereof and forms a secondary light beam at a second focus thereof. Reference numeral 103 designates a glass rod having a polygonal cross-sectional shape, and the light incidence surface 103a thereof is located at or near the second focus of the reflector 102.

The glass rod 103 serves to reduce the luminance irregularity of the light source 101, and divides a light beam incident on the light incidence surface 103a thereof into a plurality of light beams to thereby form a plurality of tertiary light source images, which emerge from the light emergence surface 103b thereof.

Reference numeral 104 denotes an imaging relay lens which condenses the light beam from the light emergence surface 103b of the glass rod 103 and makes it into a parallel (telecentric) light beam, and causes it to enter a polarizing conversion element 107.

The polarizing conversion element 107 converts the unpolarized light beam entering it into a light beam of which the plane of polarization is uniformized into a predetermined direction of polarization and causes it to emerge therefrom and enter an integrated relay lens 105. The integrated relay lens 105 condenses light beams emitted from a plurality of the glass rod 103 and causes them to overlap with the position of a predetermined liquid crystal panel through the intermediary of dichroic mirrors 12, 13, a mirror 14 and a condenser lens 8.

The condenser lens 8 (8b, 8g, 8r) efficiently condenses this illuminating light on the pupil of a projection lens 15 which will be described later. A dichroic mirror for color resolution is provided between the integrated relay lens 105 and the condenser lens 8 and directs R, G and B lights to liquid crystal panels 9, 10 and 11, respectively.

In this embodiment, the red light (R light) and green light (G light) are reflected by the dichroic mirror 12 and blue light (B light) is transmitted through the dichroic mirror 12, and G light is reflected by the dichroic mirror 13 and R light is transmitted through the dichroic mirror 13.

The B light transmitted through the dichroic mirror 12 illuminates the liquid crystal panel for B light (second liquid crystal panel) 11 through the intermediary of a mirror 14 and the condenser lens 8b.

The R light reflected by the dichroic mirror 12 and transmitted through the dichroic mirror 13 illuminates the liquid crystal panel for R light (third liquid crystal panel) 9 through the condenser lens 8r.

The light beam from the liquid crystal panel 11 for B light is transmitted through a dichroic mirror 19 for transmitting B light therethrough and reflecting G light, and enters first entrance surface 16c of a dichroic prism 16 comprising two prisms 16a and 16b having dichroic film applied to a joined surface for color combination and joined together, through a first field lens 17.

The light beam from the liquid crystal panel 10 for G light is reflected by a dichroic mirror 19 and enters the first entrance surface 16c of the dichroic prism 16 through the first field lens 17.

The light beam from the liquid crystal panel 9 for R light is reflected by a dichroic mirror 20 and enters a second entrance surface 16d of the dichroic prism 16 through a second field lens 18. Images based on the liquid crystal panels 9, 10 and 11 are combined together by the dichroic surface 16e of the dichroic prism 16, and the combined image is caused to emerge from the exit surface 16f of the dichroic prism 16 and is projected onto the surface of a screen (not shown) by a projection lens 15.

The first and second field lenses 17 and 18 act to make the image plane side (the liquid crystal panel side) of the projection lens telecentric.

FIGS. 11 to 15 are typical graphs of the spectral characteristics of the dichroic mirrors 12, 13, 19, 20 and the dichroic film on the dichroic surface 16e of the dichroic prism 16 at an angle, of incidence of 45°.

Figure 16:
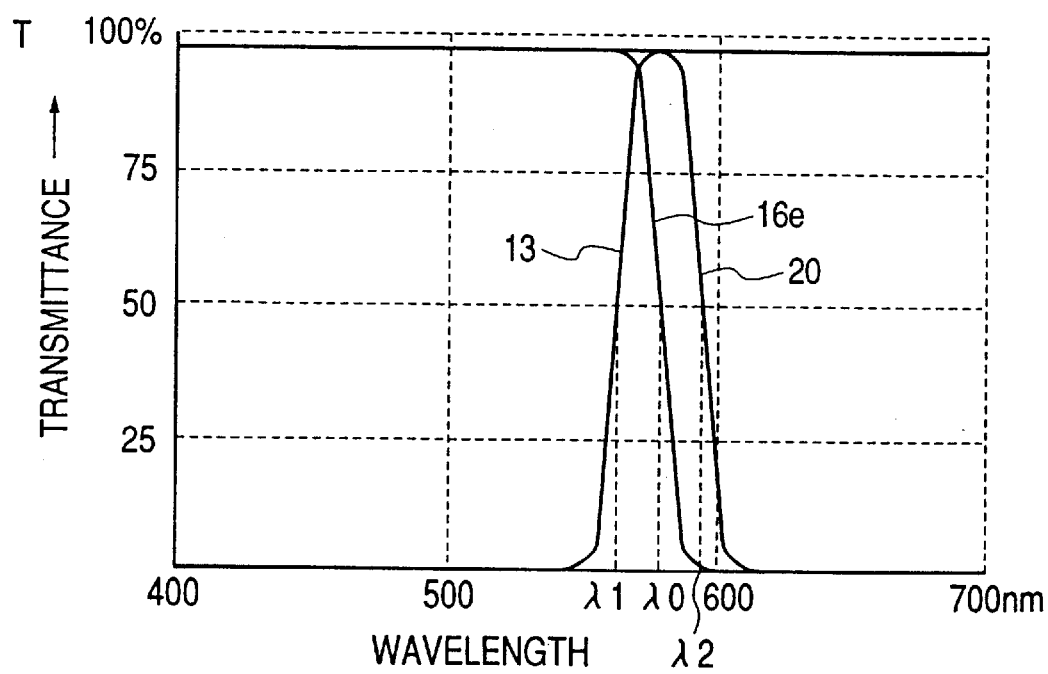
FIG. 16 is an illustration of the spectral characteristic of the dichroic mirror of FIG. 10.

FIG. 16 is an illustration of the dichroic mirrors 13, 20 and 16e provided in the optical path of R light. FIG. 16 shows the spectral characteristics of the dichroic mirror 13 of FIG. 12, the dichroic mirror 20 of FIG. 14 and the dichroic film 16e of FIG. 15 in overlapping relationship with one another.

In FIG. 16 of the spectral characteristics, curves 16e, 13 and 20 indicate the dichroic film and the dichroic mirrors 13 and 20, respectively (this also holds true in the following).

When as shown in FIG. 16, in the dichroic mirror used in the optical path of R light, the wavelengths of the transmittance 50% of the dichroic film of the dichroic prism 16 and the dichroic films of the dichroic mirrors 13 and 20 at an angle of incidence of 45° are defined as $\lambda 0$, $\lambda 1$ and $\lambda 2$, respectively, they are set so that $\lambda 1 < \lambda 0 < \lambda 2$.

Figure 17:
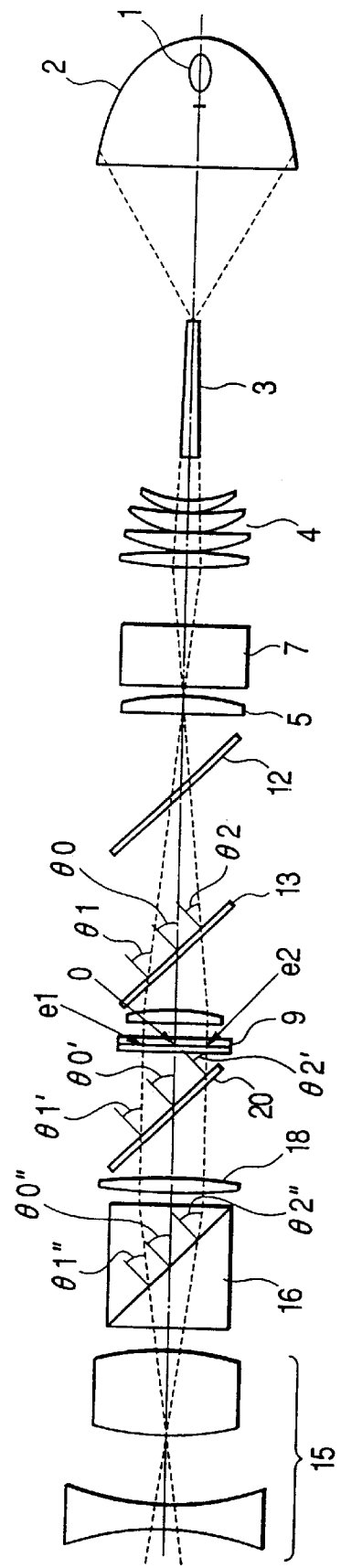
FIG. 17 is an illustration of an optical path when an optical path in FIG. 10 is developed.

FIG. 17 is an illustration in which of the optical paths leading from the light source 101 of FIG. 10 to the projection lens 15, only the optical path of R light is extracted and developed. The R light is reflected by the dichroic mirrors 12 and 20 and the dichroic mirror 16e, but in FIG. 17, it is shown as being transmitted therethrough.

Figure 18:
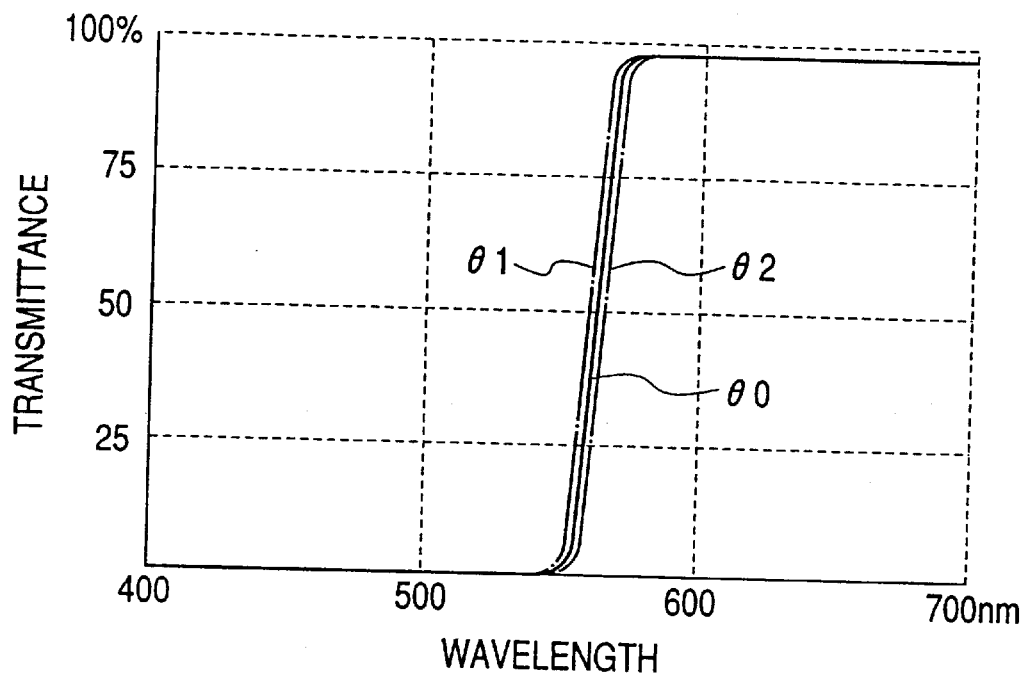
FIG. 18 is an illustration of the incidence angle characteristic of the dichroic mirror of FIG. 10.
Figure 19:
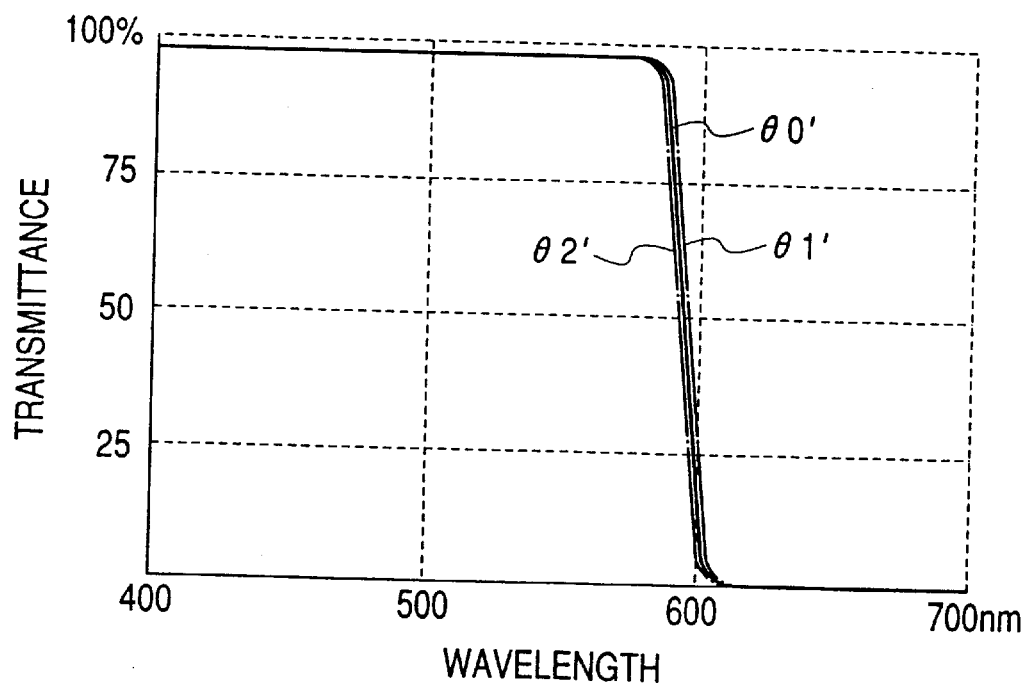
FIG. 19 is an illustration of the incidence angle characteristic of the dichroic mirror of FIG. 10.
Figure 20:
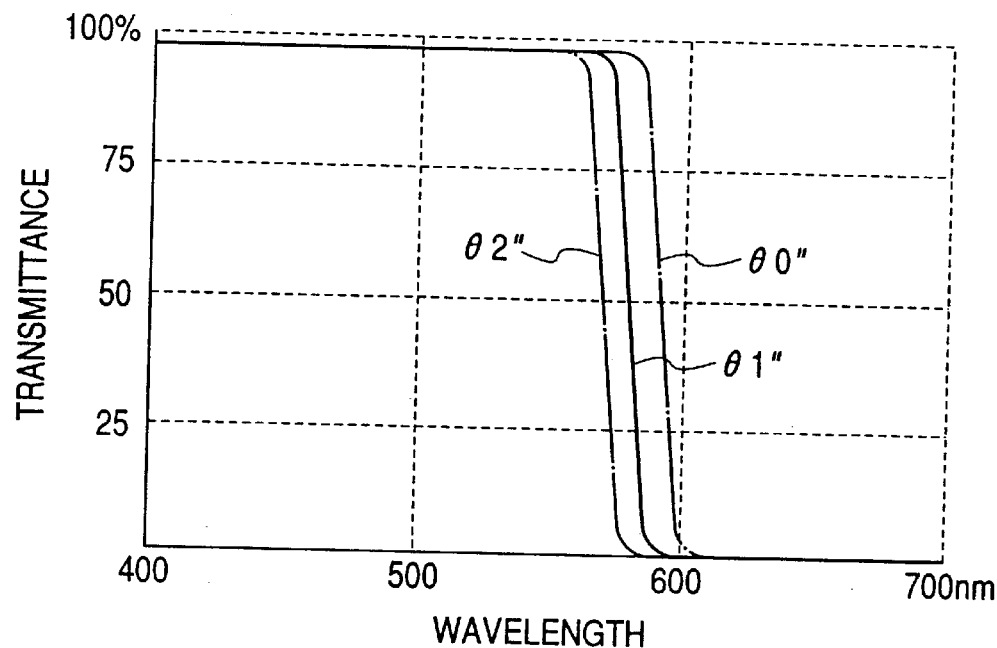
FIG. 20 is an illustration of the incidence angle characteristic of the dichroic mirror of FIG. 10.

The angles of incidence $\theta 0$, $\theta 1$ and $\theta 2$ of the central rays of the light beams incident on the dichroic mirrors 13, 20 and the dichroic film 16e differ from one another on the central portion 0 and end portions e1 and e2 of the image field (liquid crystal panel) 9 of the R light, and as shown in FIGS. 18, 19 and 20, the cut wavelengths are fluctuated thereby and particularly, the range of the fluctuation is great on the dichroic film sandwiched between two sheets of glass.

FIGS. 18, 19 and 20 show the spectral characteristics of the dichroic mirrors 13, 20 and the dichroic film 16e, respectively, with respect to the angles of incidence $\theta 0$, $\theta 1$ and $\theta 2$ ($\theta 0'$, $\theta 1'$, $\theta 2'$, $\theta 0''$, $\theta 1''$ and $\theta 2''$).

Figure 21:
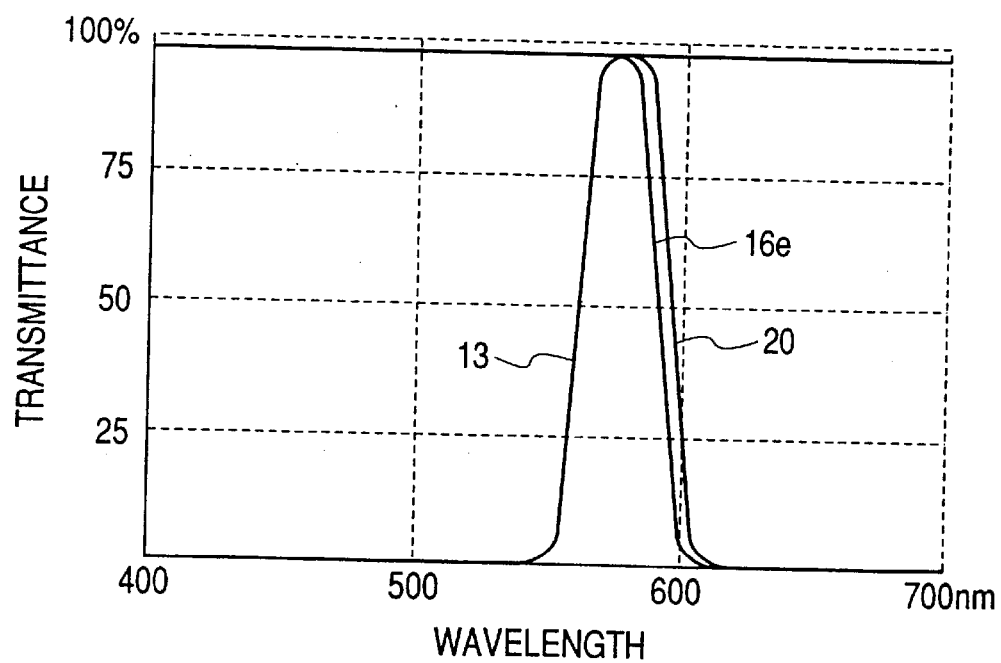
FIG. 21 is an illustration of the incidence angle characteristic of the dichroic mirror of FIG. 10.
Figure 22:
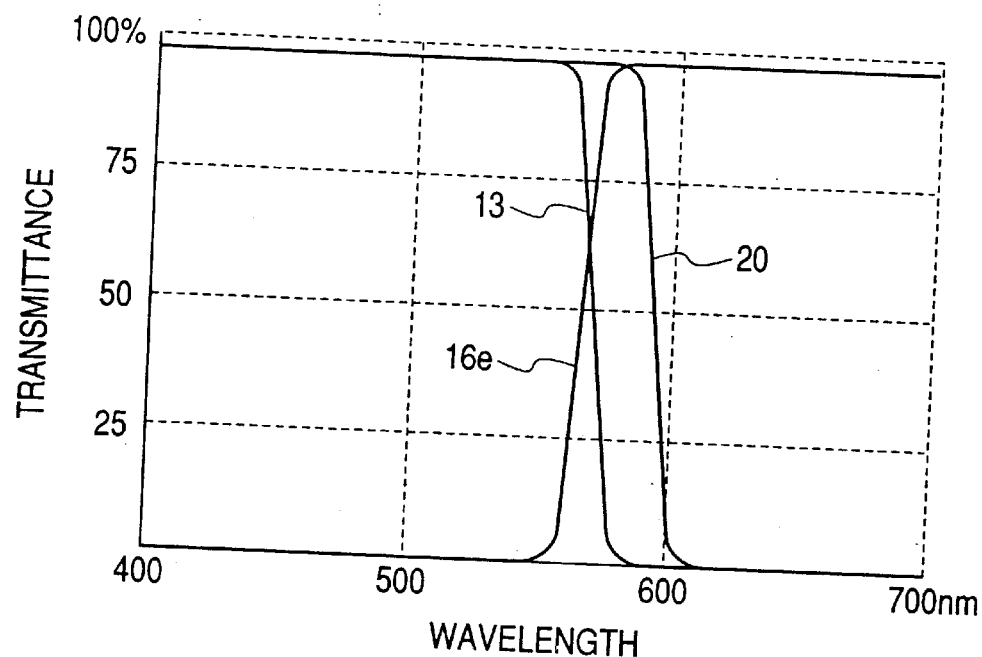
FIG. 22 is an illustration of the incidence angle characteristic of the dichroic mirror of FIG. 10.

So, the wavelength $v0$ of the transmittance 50% of the dichroic film 16e of FIG. 20 in which the fluctuation is great is set to between the wavelengths $\lambda 1$ and $\lambda 2$ of the dichroic mirrors 13 and 20, whereby even if the wavelength $\lambda 0$ is greatly fluctuated, it is fluctuated between the small fluctuations of the wavelengths $\lambda 1$ and $\lambda 2$ as shown in FIGS. 21 and 22, and the fluctuation does not affect the actually utilized wavelength area, thus reducing the occurrence of color irregularity.

The greater are the differences in cut wavelength between the wavelength $\lambda 0$ and the wavelengths $\lambda 1$, $\lambda 2$, the more can be eliminated the influence of the fluctuation of the wavelength $\lambda 0$, but if the differences are too great, the actually used wavelength area becomes narrow and the quantity of light decreases and it becomes dark and therefore, preferably the differences may be set as follows;

$0 < \lambda 0 - \lambda 1 < 20$ nm $0 < \lambda 2 - \lambda 0 < 20$ nm

Figure 23:
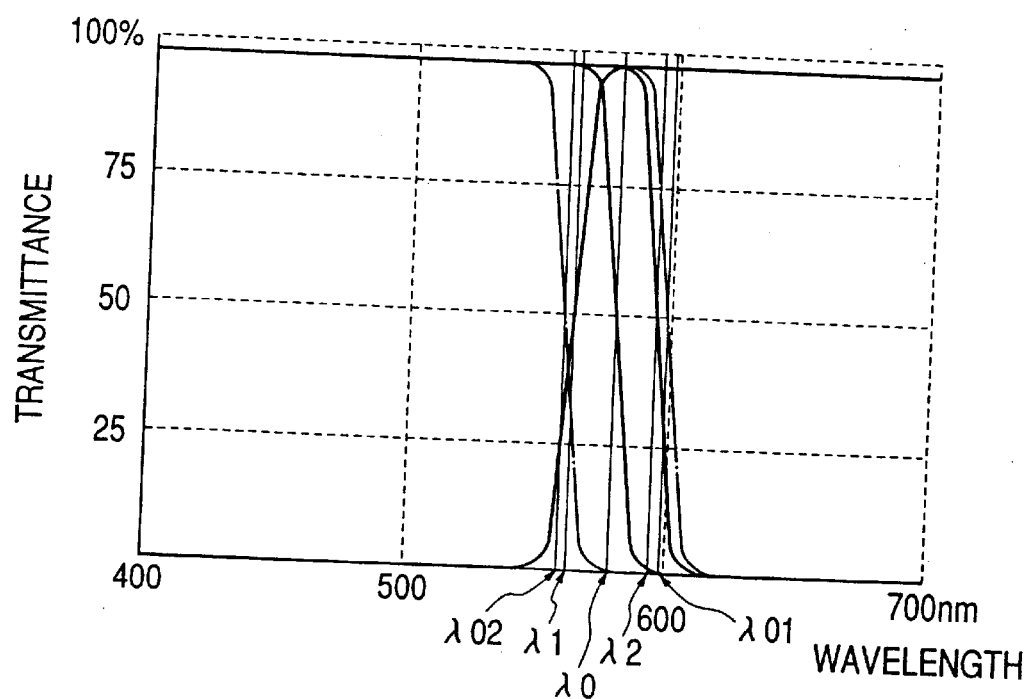
FIG. 23 is an illustration of the incidence angle characteristic of the dichroic film of FIG. 10.

When in the dichroic mirror 16e of the dichroic prism 16, the wavelength of the transmittance 50% at the angle of incidence $\theta 1''$ is defined as $\lambda 01$ and the wavelength of the transmittance 50% at the angle of incidence $\theta 2''$ is defined as $\lambda 02$ and as shown in FIG. 23, the fluctuated wavelength $\lambda 0$ ($\lambda 01$, $\lambda 02$) exceeds the wavelengths $\lambda 1$ and $\lambda 2$, the differences may preferably be set as follows:

$\lambda 1 - \lambda 02 > 5$ nm $\lambda 01 - \lambda 2 > 5$ nm

According to this, the influence of $\lambda 0$ ($\lambda 01$, $\lambda 02$) on the wavelength area used is suppressed to the same degree as that on the dichroic mirror and therefore, the effect obtained by the present invention is not spoiled.

In this embodiment, the space between the first and second field lenses 17 and 18 and the liquid crystal panel is made into a substantially telecentric system, whereby the angle of view incident on the dichroic mirror 20 can be made substantially constant irrespective of the position of the image field (liquid crystal panel), and the fluctuation of the cut wavelength occurring on the dichroic mirror 20 is mitigated.

Figure 24:
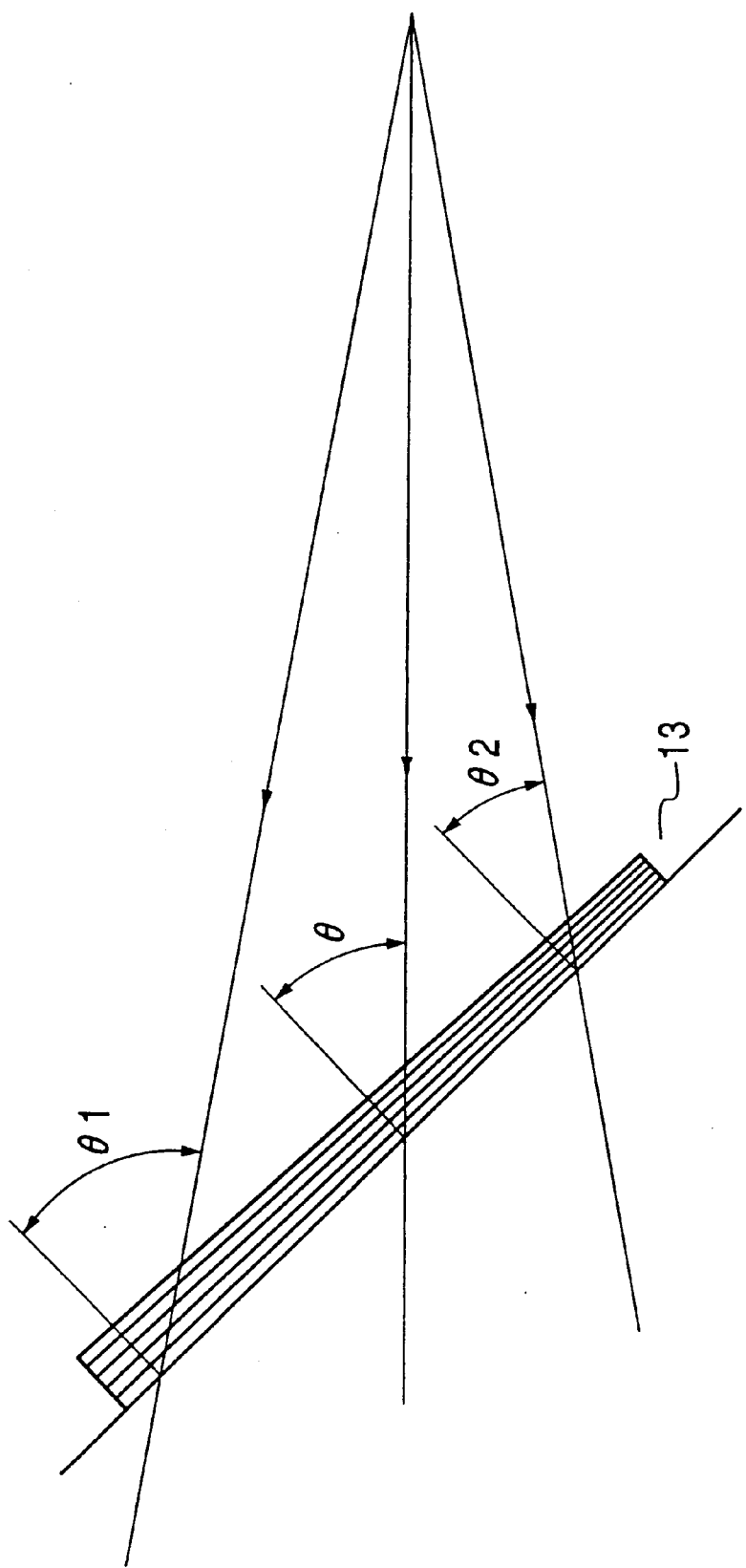
FIG. 24 is an illustration of the dichroic film of FIG. 10.

Further, the construction of the dichroic film of the dichroic mirror 13 may be made such that as shown in FIG. 24, the film thickness thereof is continuously decreased in a direction in which the angle of incidence e becomes smaller ($\theta 1 \rightarrow \theta 2$) and that the deviation of the wavelength of the transmittance 50% by the angular deviation of the ray of light incident on the dichroic film does not occur.

According to this, the fluctuation of the wavelength of the transmittance 50% occurring on the dichroic mirror 13 can be mitigated.

A further embodiment of the present invention will now be described. The construction of the projection apparatus of this embodiment is the same as that of the embodiment of FIG. 10. This embodiment differs from the embodiment of FIG. 10 only in the spectral characteristics of the dichroic mirrors and the dichroic mirror of the dichroic prism, and in the other points, the construction of this embodiment is basically the same as that of the FIG. 10 embodiment.

Description will now be made of the action of the dichroic films of the dichroic mirrors in the present embodiment. Blue light (B light) and green light (G light) are reflected by the dichroic mirror 12 and red light (R light) is transmitted through the dichroic mirror 12, and G light is reflected by the dichroic mirror 13 and B light is transmitted through the dichroic mirror 13. The dichroic mirror 19 transmits R light therethrough and reflects G light, the dichroic mirror 20 reflects B light, and the dichroic mirror 16e of the dichroic prism 16 reflects B light and transmits G light and R light therethrough.

Figure 25:
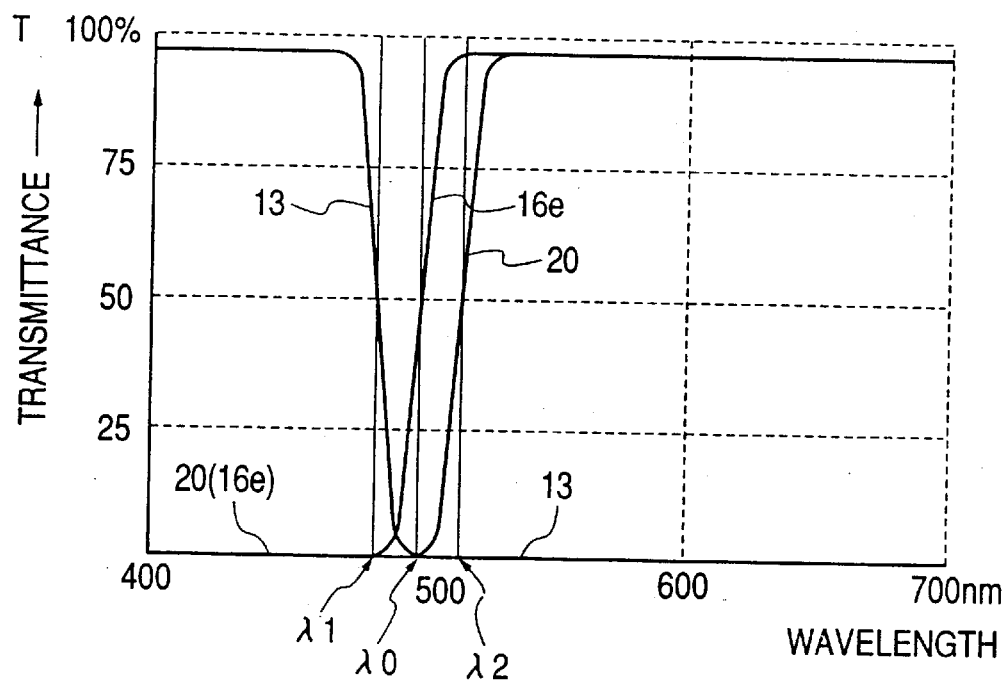
FIG. 25 is an illustration of the spectral characteristic of a dichroic mirror according to another embodiment of the present invention.

FIG. 25 shows the spectral characteristics of the dichroic film 16e of the dichroic prism 16 and the dichroic mirrors 13 and 20 in the optical path of the B light at this time. In FIG. 25, spectral characteristic curves are indicated by curves 16e, 13 and 20.

Another embodiment of the present invention will now be described. The construction of the projection apparatus of this embodiment is the same as that of the embodiment of FIG. 10. This embodiment differs from the embodiment of FIG. 10 only in the spectral characteristics of the dichroic mirrors and the dichroic mirror of the dichroic prisms, and in the other points, the construction of this embodiment is basically the same as that of the FIG. 10 embodiment.

Description will now be made of the action of the dichroic film of the dichroic mirrors in the present embodiment. Blue light (B light) and green light (G light) are reflected by the dichroic mirror 12 and the red light (R light) is transmitted through the dichroic mirror 12, and B light is reflected by the dichroic mirror 13 and G light is transmitted through the dichroic mirror 13.

The dichroic mirror 19 transmits R light therethrough and reflects B light, the dichroic mirror 20 reflects G light, and the dichroic mirror 16e of the dichroic prism 16 reflects G light and transmits B light and R light therethrough.

Figure 26:
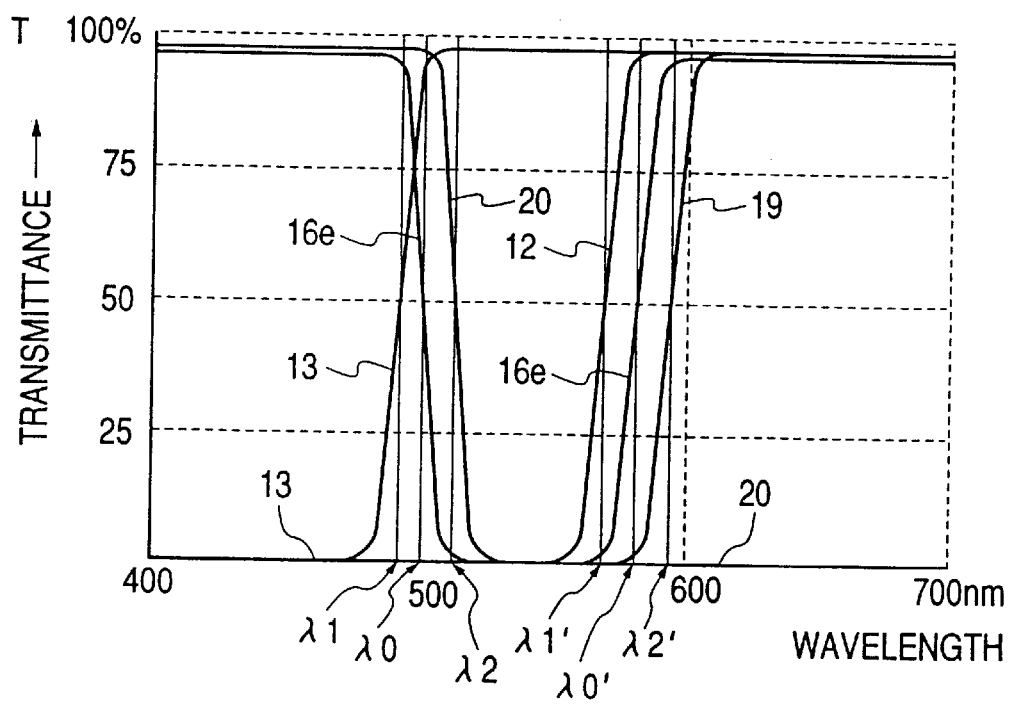
FIG. 26 is an illustration of the spectral characteristic of a dichroic mirror according to another embodiment of the present invention.

FIG. 26 shows the spectral characteristics of the dichroic film 16e of the dichroic prism 16 and the dichroic mirrors 12, 13, 19 and 20 in the optical path of the G light at this time.

In FIG. 26, the cut wavelengths of the transmittance 50% of the dichroic film 16e and the dichroic mirrors 12 and 19 in the optical path of the R light of the light beam transmitted through the dichroic mirror 12 at an angle of incidence of 45° are shown as $\lambda 0'$, $\lambda 1'$ and $\lambda 2'$, respectively. Thereby, $\lambda 1' < \lambda 0' < \lambda 2'$ is satisfied.

While the above-described embodiments are liquid crystal projectors of the same construction, the present invention is not restricted to this layout, but the effect of the present invention is spoiled in no way if there is at least one dichroic film sandwiched between two sheets of glass and there are at least two dichroic mirrors on the optical path transmitted through or reflected by the dichroic film and the conditions that $\lambda 1 < \lambda 0 < \lambda 2$ $0 < \lambda 0 - \lambda 1 < 20$ nm $0 < \lambda 2 - \lambda 0 < 20$ nm are satisfied when the cut wavelengths of the dichroic film constituting the dichroic prism and the dichroic films of the two dichroic mirrors at a predetermined angle of incidence are defined as $\lambda 0$, $\lambda 1$ and $\lambda 2$, respectively.

According to the present invention, as described above, there can be achieved a projection apparatus which uses a color resolving optical system in which image information based on color liquid crystal panels is appropriately set and a color combining system, whereby which can project the image information onto a predetermined surface (a screen surface) without any color irregularity while having high optical performance.

What is claimed is:

1. A projection apparatus comprising:

a light source;

an illuminating optical system having means for separating light from said light source into three lights differing in color from one another;

three display panels each of which is illuminated with corresponding one of said three lights; and a projection optical system including a first dichroic mirror for combining the lights from two display panels of said three display panels, a second dichroic mirror for combining the lights from said first dichroic mirror and light from the other display panel of said three display panels, and a projection lens for projecting the lights from said second dichroic mirror, wherein said first dichroic mirror has a flat plate shape inclined with respect to the optical axis of said projection optical system, and a lens is provided between said first dichroic mirror and said second dichroic mirror so as to make the display panel side telecentric.

2. A projection apparatus comprising:

a light source;

an illuminating optical system having means for separating light from said light source into three lights differing in color from one another;

three display panels each of which is illuminated with corresponding one of said three lights; and a projection optical system including a first dichroic mirror for combining the lights from two display panels of said three display panels, a third dichroic mirror for reflecting the light from the other display panel of said three display panels, a second dichroic mirror for combining the lights from said first and third dichroic mirrors, and a projection lens for projecting the lights from said second dichroic mirror, wherein said first and third dichroic mirrors have flat plate shapes both of which are inclined with respect to the optical axis of said projection optical system, and a lens is provided between said first dichroic mirror and said second dichroic mirror so as to make the display panel side telecentric, and a lens is provided between said third dichroic mirror and said second dichroic mirror so as to make the display panel side telecentric.

3. An apparatus according to claim 1 or 2, wherein said second dichroic mirror has a Cube shape in which a dichroic film is sandwiched and adhered between oblique surfaces of two right-angled prisms.

4. An apparatus according to claim 2, wherein said optical element provided between said first and second dichroic mirrors and said optical element provided between said third and second dichroic mirrors are lenses.

5. An apparatus according to claim 1, wherein said projection lens has, in succession from a screen side, a negative lens unit having negative refractive power, and a positive lens unit having positive refractive power, and effects a variable power by varying the space between said two lens units.

6. A projection apparatus comprising:
a light source;
an illuminating optical system having a pair of dichroic mirrors for separating light from said light source into three lights differing in color from one another;
three display panels each of which is illuminated with corresponding one of said three lights; and
a projection optical system including a first dichroic mirror for combining the lights from two display panels, of said three display panels, a third dichroic mirror for reflecting the light from the other display panel of said three display panels, a second dichroic mirror for combining the lights from said first and third dichroic mirrors, a lens between said first dichroic mirror and said second dichroic mirror to make the display panel side telecentric and a projection lens for projecting the lights from said second dichroic mirror,
wherein said pair of dichroic mirrors, said first and third dichroic mirrors have flat plate shapes which are inclined with respect to the optical axis of said projection optical system, and said second dichroic mirror has two prisms, and a dichroic film is sandwiched and adhered between oblique surfaces of said two prisms, and
wherein the following conditions are satisfied:
$\lambda 1 < \lambda 0, < \lambda 2$
$0 < \lambda 0 - \lambda 1 < 20$ nm
$0 < \lambda 2 - \lambda 0 < 20$ nm,
where $\lambda 0$ represents cut wavelength of said second dichroic milTor for ray of light incident on said dichroic film at an angle of 45 degrees, $\lambda 1$ represents cut wavelength of one of the paired dichroic mirrors, close to the third dichroic mirror, for ray of light incident thereon at an angle of 45 degrees, and $\lambda 2$ represents cut wavelength of said third dichroic mirror for ray of light incident thereon at an angle of 45 degrees and wherein said cut wavelength is a wavelength at which transmittance is 50% on the spectral transmittance curve (wavelength vs. transmittance) of said dichroic mirror.

7. A projection apparatus comprising:
a light source;
an illuminating optical system having a pair of dichroic mirrors for separating light from said light source into three lights differing in color from one another;
three display panels each of which is illuminated with corresponding one of said three lights; and
a projection optical system including a first dichroic mirror for combining the lights from two display panels of said three display panels, a third dichroic mirror for reflecting the light from the other display panel of said three display panels, a second dichroic mirror for combining the lights from said first and third dichroic mirrors, a lens between said first diehroic mirror and said second dichroie mirror to make the display panel side telecentric and a projection lens for projecting the lights from said second dichroic mirror,
wherein said pair of dichroic mirrors, said first and third dichroic mirrors have flat plate shapes which are inclined with respect to the optical axis of said projection optical system, and said second dichroic mirror has two prisms, and a dichroic film is sandwiched and adhered between oblique surfaces of said two prisms, and
wherein the following condition is satisfied:
$\lambda 1 < \lambda 0 < \lambda 2$,
where $\lambda 0$ represents cut wavelength of said second dichroic mirror for ray of light incident on said dichroic film at an angle of 45 degrees, $\lambda 1$ represents cut wavelength of one of the paired dichroic mirrors, close to the third dichroic milTor, for ray of light incident thereon at an angle of 45 degrees, and $\lambda 2$ represents cut wavelength of said third dichroic mirror for ray of light incident thereon at an angle of 45 degrees, and wherein said cut wavelength is a wavelength at which transmittance is 50% on the spectral transmittance curve (wavelength vs. transmittance) of said dichroic mirror.

8. An apparatus according to claim 6 or 7, wherein an optical element is provided between said first dichroic mirror and said second dichroic mirror so as to make the display panel side telecentric, and an optical element is provided between said third dichroic mirror and said second dichroic mirror so as to make the third dichroic mirror side telecentirc.

9. A projection apparatus comprising:
a light source;
an illuminating optical system having a plurality of dichroic mirrors for separating light from said light source into three lights differing in color from one another;
three display panels each of which is illuminated with corresponding one of said three lights; and
a projection optical system including a plurality of dichroic mirrors for combining the lights from said three display panels, a lens located between a first dichroic mirror and a second dichroic mirror to make the display panel side telecentric and a projection lens for projecting the lights from said plurality of dichroic mirrors for combining the lights,
wherein the following conditions are satisfied:
$\lambda 1 < \lambda 0 < \lambda 2$
$0 < \lambda 0 - \lambda 1 < 20$ nm
$0 < \lambda 2 - \lambda 0 < 20$ nm,
where $\lambda 0$ represents cut wavelength of said plurality of dichroic mirrors of said projection optical system for combining the lights for ray of light incident on a dichroic film thereof at an angle of 45 degrees, $\lambda 1$ and $\lambda 2$ represent cut wavelengths of predetermined two dichroic mirrors of said plurality of dichroic mirrors of said illuminating optical system for ray of light incident thereon at an angle of 45 degrees, respectively, and wherein said cut wavelength is a wavelength at which transmittance is 50% on the spectral transmittance curve (wavelength vs. transmittance) of said dichroic mirror.

10. A projection apparatus comprising:

a light source;

an illuminating optical system having a plurality of dichroic mirrors for separating light from said light source into three lights differing in color from one another;

three display panels each of which is illuminated with corresponding one of said three lights; and a projection optical system including a plurality of dichroic mirrors for combining the lights from said three display panels, a lens located between a first dichroic mirror and a second dichroic mirror to make the display panel side telecentric and a projection lens for projecting the lights from said plurality of dichroic mirrors for combining the lights, wherein the following conditions are satisfied:

$\lambda 1 < \lambda 0 < \lambda 2$ wherein $\lambda 0$ represents cut wavelength of said plurality of dichroic mirrors of said projection optical system for combining the lights for ray of light incident on a dichroic film thereof at an angle of 45 degrees, $\lambda 1$ and $\lambda 2$ represent cut wavelengths of predetermined two dichroic mirrors of said plurality of dichroic mirrors of said illuminating optical system for ray of light incident thereon at an angle of 45 degrees, respectively, and wherein said cut wavelength is a wavelength at which transmittance is 50% on the spectral transmittance curve (wavelength vs. transmittance) of said dichroic mirror.

* * * * *

UNITED STATES PATENT AND TRADEMARK OFFICE
CERTIFICATE OF CORRECTION

PATENT NO. : 6,273,568 B1
DATED : August 14, 2001
INVENTOR(S) : Atsushi Okuyama

It is certified that error appears in the above-identified patent and that said Letters Patent is hereby corrected as shown below:

Column 12,
Line 38, "v0" should read -- $\lambda 0$ --

Column 13,
Line 13, "incidence e" should read -- incidence $\theta$ --

Column 15,
Line 8, "Cube" should read -- cube --
Line 48, "0<$\lambda$0-1<20 nm" should read -- 0<$\lambda$0-$\lambda$1<20 nm --
Line 51, "milTor" should read -- mirror --

Column 16,
Line 9, "diehroic" should read -- dichroic --
Line 10, "dichroie" should read -- dichroic --
Line 26, "milTor," should read -- mirror, --

Signed and Sealed this

Twenty-third Day of April, 2002

Attest:

Attesting Officer

JAMES E. ROGAN
Director of the United States Patent and Trademark Office